United States Patent
Kubota et al.

(10) Patent No.: US 10,308,075 B2
(45) Date of Patent: Jun. 4, 2019

(54) PNEUMATIC TIRE

(71) Applicant: The Yokohama Rubber Co., LTD., Minato-ku, Tokyo (JP)

(72) Inventors: Masayoshi Kubota, Hiratsuka (JP); Atsushi Tanno, Hiratsuka (JP); Yuji Minami, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 183 days.

(21) Appl. No.: 15/108,226

(22) PCT Filed: Dec. 19, 2014

(86) PCT No.: PCT/JP2014/083721
§ 371 (c)(1),
(2) Date: Jun. 24, 2016

(87) PCT Pub. No.: WO2015/098755
PCT Pub. Date: Jul. 2, 2015

(65) Prior Publication Data
US 2016/0318349 A1   Nov. 3, 2016

(30) Foreign Application Priority Data
Dec. 27, 2013   (JP) .................................. 2013-271932

(51) Int. Cl.
*B60C 11/03* (2006.01)
*B60C 9/18* (2006.01)
(Continued)

(52) U.S. Cl.
CPC ............ *B60C 11/0332* (2013.01); *B60C 3/04* (2013.01); *B60C 9/18* (2013.01); *B60C 9/28* (2013.01);
(Continued)

(58) Field of Classification Search
CPC .......... B60C 11/0332; B60C 3/04; B60C 9/18
See application file for complete search history.

(56) References Cited

U.S. PATENT DOCUMENTS

| | | | |
|---|---|---|---|
| 4,724,878 A * | 2/1988 | Kabe | B60C 11/00 |
| | | | 152/209.14 |
| 2004/0026001 A1 | 2/2004 | Kohno et al. | |

(Continued)

FOREIGN PATENT DOCUMENTS

| | | |
|---|---|---|
| CN | 1514776 | 7/2004 |
| CN | 102555675 | 7/2012 |

(Continued)

OTHER PUBLICATIONS

International Search Report for International Application No. PCT/JP2014/083721 dated Mar. 24, 2015, 4 pages, Japan.

*Primary Examiner* — Jacob T Minskey
*Assistant Examiner* — Melody Tsui
(74) *Attorney, Agent, or Firm* — Thorpe North & Western

(57) ABSTRACT

A pneumatic tire includes a cylindrical annular structure disposed around a rotational axis; a carcass portion including a rubber covered cord, at least a portion of the carcass portion being disposed to the outer side of the annular structure in a direction parallel to the rotational axis; and a rubber layer including a tread portion, at least a portion of the rubber layer being disposed to an outer side of the annular structure in a radiation direction with respect to the rotational axis. In such a pneumatic tire, SW/OD≤0.30 is satisfied, where SW is a total tire width and OD is a tire outer diameter.

14 Claims, 11 Drawing Sheets

(51) Int. Cl.
  *B60C 3/04*   (2006.01)
  *B60C 9/28*   (2006.01)
  *B60C 11/00*   (2006.01)

(52) U.S. Cl.
  CPC ........ *B60C 11/033* (2013.01); *B60C 11/0304*
  (2013.01); *B60C 2011/0033* (2013.01); *Y02T*
  *10/862* (2013.01)

(56) References Cited

U.S. PATENT DOCUMENTS

| | | | |
|---|---|---|---|
| 2012/0160387 A1 | 6/2012 | Tanno et al. | |
| 2012/0298279 A1* | 11/2012 | Tanno | B60C 9/18 152/556 |
| 2013/0042953 A1 | 2/2013 | Kuwayama | |
| 2013/0048173 A1* | 2/2013 | Kiwaki | B60C 11/0309 152/209.18 |
| 2014/0110034 A1 | 4/2014 | Tanno et al. | |

| | | | |
|---|---|---|---|
| 2016/0001604 A1 | 1/2016 | Minami et al. | |

FOREIGN PATENT DOCUMENTS

| | | | |
|---|---|---|---|
| JP | 62103205 A * | 5/1987 | |
| JP | 05294111 A * | 11/1993 | |
| JP | H05-0294111 | 11/1993 | |
| JP | 2008-201380 | 9/2008 | |
| JP | 2008201379 A * | 9/2008 | |
| JP | 2012-144197 | 8/2012 | |
| JP | 2013-001193 | 1/2013 | |
| JP | 2013-237283 | 11/2013 | |
| JP | 2013237283 A * | 11/2013 | |
| JP | 5360333 | 12/2013 | |
| WO | WO 2003/024727 | 3/2003 | |
| WO | WO 2011/135774 | 11/2011 | |
| WO | WO 2012/173121 | 12/2012 | |
| WO | WO-2012173121 A1 * | 12/2012 | ............. B29D 30/06 |
| WO | WO 2014/128966 | 8/2014 | |

* cited by examiner

PNEUMATIC TIRE

TECHNICAL FIELD

The present technology relates to a pneumatic tire for a passenger vehicle with improved fuel economy.

BACKGROUND ART

Conventionally, in order to help improve the fuel economy of hybrid vehicles (HV), electric vehicles (EV), and the like, pneumatic tires with reduced rolling resistance have been proposed. In recent years in particular, with concern for the environment increasing, there is a demand for pneumatic tires capable of improved fuel economy.

As a means for reducing the rolling resistance of a pneumatic tire, technology of reducing the air resistance around the tire by decreasing the total width (SW) and the forward projection area of a pneumatic tire is known (see for example International Patent Publication No. WO2011/135774).

However, application of the above-described means results in a pneumatic tire with a narrow total width and thus a narrow ground contact width. To maintain a certain load capacity, the outer diameter (OD) must then be increased. As a result, the footprint length of such a pneumatic tire is made comparatively long.

While a pneumatic tire with a long footprint length has greatly improved water drainage properties (WET performance), due to the narrow ground contact width of such a tire, cornering force (CF) as well as steering stability may decrease.

SUMMARY

The present technology provides a pneumatic tire capable of reducing rolling resistance and improving the steering stability performance reduced by reducing the rolling resistance.

A pneumatic tire is provided, including a cylindrical annular structure disposed around a rotational axis;

a carcass portion including a rubber covered cord, at least a portion of the carcass portion being disposed to the outer side of the annular structure in a direction parallel to the rotational axis; and a rubber layer including a tread portion, at least a portion of the rubber layer being disposed to an outer side of the annular structure in a radiation direction with respect to the rotational axis. In such a pneumatic tire, $SW/OD \leq 0.30$ is satisfied, where SW is a total tire width and OD is a tire outer diameter.

A ground contact surface of the tread portion and an outer surface of the annular structure that faces outward in the radiation direction with respect to the rotational axis are preferably parallel to the rotational axis.

Preferably $$0.9 \leq BW/W \leq 1.1$$

is satisfied, where W is a width of a ground contact region of the tread portion, and BW is a dimension of the annular structure in the direction parallel to the rotational axis.

Preferably $$0.65 \leq W/SW \leq 0.90$$

is satisfied, where W is a width of a ground contact region of the tread portion.

Preferably $$0.14 \times (OD-RD)/2SW + 0.65 \leq W/SW \leq 0.14 \times (OD-RD)/2SW + 0.76$$

is satisfied, where W is a width of a ground contact region of the tread portion, and RD is a tire rim diameter.

The annular structure preferably includes a plurality of through holes.

The annular structure is preferably formed of a strip-shaped metal plate, end portions thereof being welded together; and $$150 \text{ GPa} \leq E \leq 250 \text{ GPa, and}$$

$$0.2 \text{ mm} \leq Tb \leq 0.8 \text{ mm}$$

are preferably satisfied, where E is the Young's modulus of the metal, and Tb is a thickness of the plate.

The rubber layer preferably includes a main groove formed in the tread portion to surround the rotational axis; and an inner surface that faces a direction opposite the ground contact surface of the tread portion, and $$0.05 \leq Tu/T1 \leq 0.15$$

is preferably satisfied, where T1 is a first thickness of the rubber layer, which is a distance from the ground contact surface of the tread portion to the inner surface, and Tu is a second thickness of the rubber layer, which is a distance from a bottom surface of the main groove to the inner surface.

The rubber layer preferably includes a narrow groove formed, to surround the rotational axis, in an edge region that includes an edge portion of the ground contact region of the tread portion in the direction parallel to the rotational axis;

a center of the edge region in the direction parallel to the rotational axis is preferably aligned with the edge portion of the ground contact region; and $$DW = 0.1W$$

is preferably satisfied, where W is the width of the ground contact region of the tread portion, and DW is a width of the edge region.

The annular structure preferably includes a recess and protrusion portion on at least a portion of end portions of the annular structure in the direction parallel to the rotational axis.

An asymmetrical pattern is preferably formed by grooves in the tread portion; and the ground contact region is preferably formed satisfying:

$$10\% \leq GR \leq 25\%,$$

$$GRo < GRi \text{, and}$$

$$0.1 \leq (GRi - GRo)/GR \leq 0.6$$

where GR is a groove area ratio in the ground contact region of the tread portion, GRi is a groove area ratio in a tire inside region Ai, and GRo is a groove area ratio in a tire outside region Ao, where the tire inside region Ai is a region within the ground contact region located to a vehicle side of a tire equator line when the pneumatic tire is mounted on a vehicle, and the tire outside region Ao is a region within the ground contact region located to a side of the tire equator line opposite the vehicle side when the pneumatic tire is mounted on a vehicle.

A plurality of lateral grooves that traverse a tire circumferential direction are preferably provided in the tread portion; and $1.1 \leq GRLi/GRLo \leq 1.9$ is preferably satisfied, where GRL is a groove area ratio of the lateral grooves in the ground contact region, GRLo is a groove area ratio of the lateral grooves in the tire outside region Ao, and GRLi is a groove area ratio of the lateral grooves in the tire inside region Ai.

The lateral grooves are preferably disposed at intervals in the tire circumferential direction; and $1 < Pi/Po \leq 2$ is preferably satisfied, where Pi is a number of the lateral grooves disposed in the tire inside region Ai and Po is a number of the lateral grooves disposed in the tire outside region Ao around an entire circumference of the tread portion of the pneumatic tire.

A circumferential groove extending in the tire circumferential direction is preferably provided in an outer tire inside region Aoi and not provided in an outer tire outside region Aoo, the outer tire inside region Aoi being a region located to the tire equator line side of the tire outside region Ao having a width equivalent to 25% of a ground contact width, and the outer tire outside region Aoo being a region of the tire outside region Ao except the outer tire inside region Aoi.

An inner circumferential groove that is a circumferential groove extending in the tire circumferential direction is preferably provided in the tire inside region Ai;

an outer circumferential groove that is a circumferential groove extending in the tire circumferential direction is preferably provided in the tire outside region Ao; and $1 \leq GRBi/GRBo \leq 2$ is preferably satisfied, where GRBi is a groove area ratio of the inner circumferential groove in the tire inside region Ai, and GRBo is a groove area ratio of the outer circumferential groove in the tire outside region Ao.

The pneumatic tire according to the present technology is capable of reducing rolling resistance and improving the steering stability performance reduced by reducing the rolling resistance.

Hereinafter, understanding of the present technology is further facilitated by the accompanying drawings and description of preferred embodiments of the present technology.

DETAILED DESCRIPTION

First Embodiment

Figure 1:
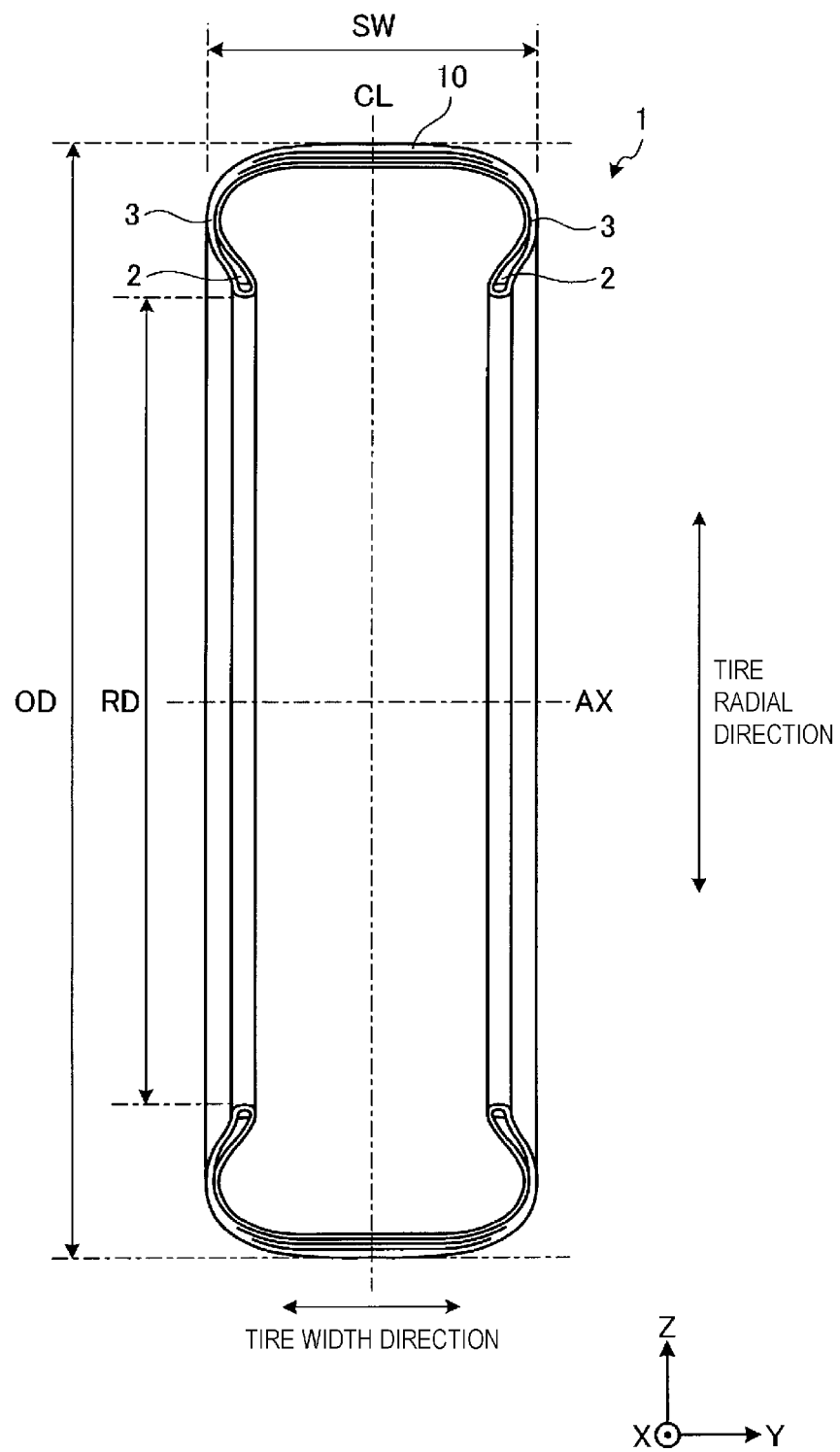
FIG. 1 is a meridian cross-sectional view of a pneumatic tire according to a first embodiment.
Figure 2:
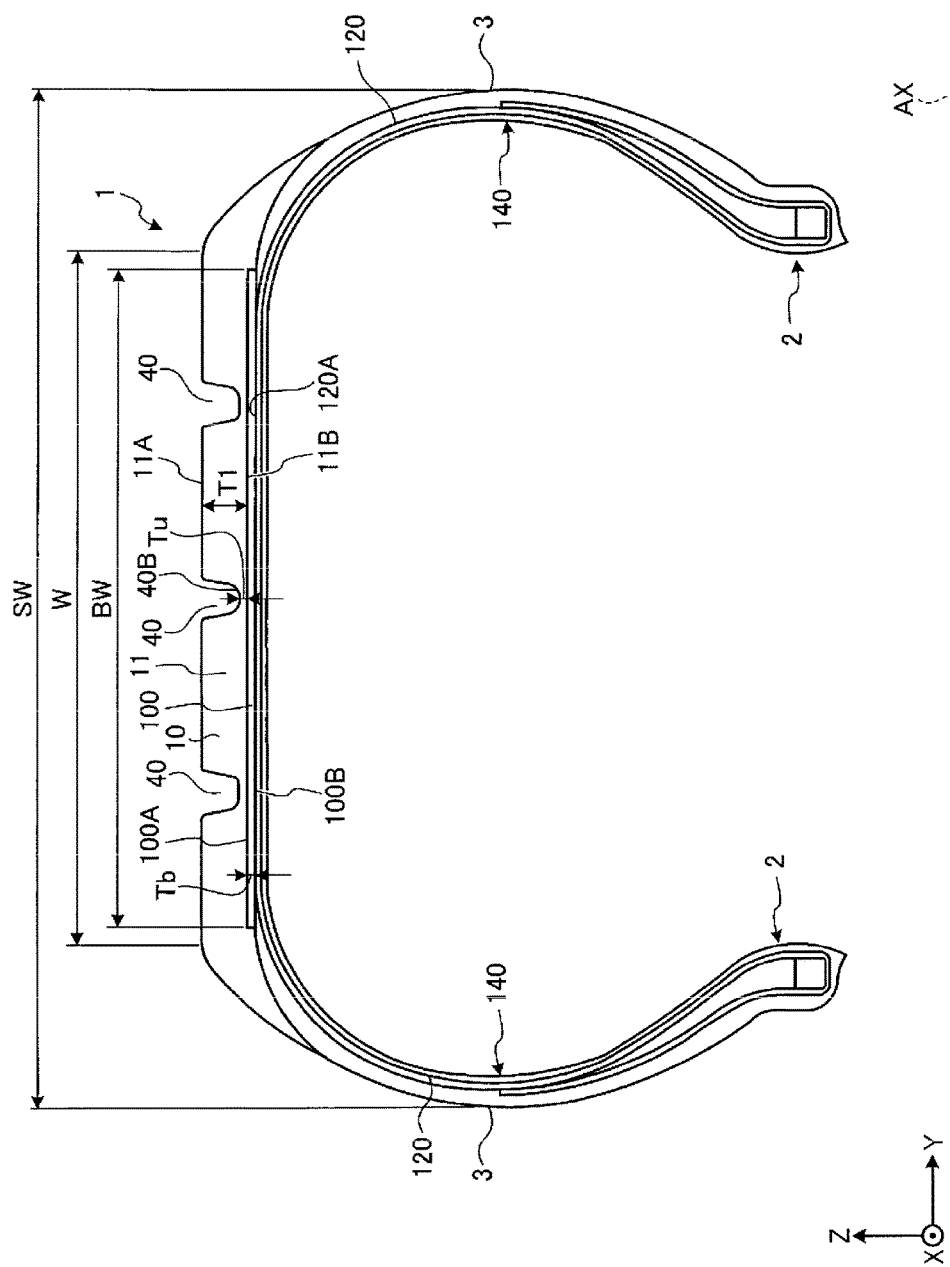
FIG. 2 is an enlarged view of a portion of the tire according to the first embodiment.

Hereinafter, a pneumatic tire 1 according to embodiments of the present technology is explained with reference to the drawings. FIG. 1 is a meridian cross-sectional view of the pneumatic tire 1 according to the embodiment of the present technology. FIG. 2 is an enlarged meridian cross-sectional view of a portion of the tire 1 according to the embodiment of the present technology. Note that the pneumatic tire 1 according to the present embodiment has a meridian cross-section shape similar to that of a conventional pneumatic tire. Here, the meridian cross-section shape of the pneumatic tire refers to the shape of the pneumatic tire in a cross section taken along a plane normal to the tire equatorial plane CL.

In the description below, an X-Y-Z Cartesian coordinates system is used, and a positional relationship of each portion is described with reference to the X-Y-Z Cartesian coordinates system. One of directions in a horizontal plane is defined as an X-axis direction, a direction orthogonal to the X-axis direction in the horizontal plane is defined as a Y-axis direction, and a direction orthogonal to each of the X-axis direction and the Y-axis direction is defined as a Z-axis direction. Further, rotational (inclination) directions around the X axis, Y axis, and the Z axis are defined as directions θX, θY, and θZ, respectively.

The pneumatic tire 1 is annular. When the tire 1 is in use, the inside of the pneumatic tire 1 is filled with air. In the description below, the pneumatic tire 1 is also referred to simply as tire 1.

In the present embodiment, a rotational axis (a central axis) AX of the tire 1 is parallel to the Y axis. The Y-axis direction is a vehicle width direction or a width direction of the tire 1. The rotational direction (equivalent to the θY direction) of the tire 1 (rotational axis AX of tire 1) may also be referred to as the circumferential direction. The X-axis direction and the Z-axis direction are radiation directions with respect to the rotational axis (central axis) AX. The radiation direction with respect to the rotational axis (the central axis) AX may also be referred to as the radial direction. The ground on which the tire 1 rolls (travels) is roughly parallel to an XY plane.

FIG. 1 and FIG. 2 are views illustrating the tire 1 in meridian cross sections through which the rotational axis AX passes. As illustrated in FIG. 1 and FIG. 2, the tire 1 is provided with a cylindrical annular structure 100 disposed around the rotational axis (central axis) AX; a carcass portion 120, at least a portion of which is disposed to the outer side of the annular structure 100 in the Y-axis direction; a tread rubber layer 11 with a tread portion 10, at least a portion of which is disposed to the outer side of the annular structure 100 in the radiation direction with respect to the rotational axis AX; and sidewall portions 3 that protect the carcass portion 120.

The annular structure 100 is a cylindrical member. The annular structure 100 is a member (reinforcing member) that retains the shape of the tire 1. The annular structure 100 includes an outer surface 100A and an inner surface 100B. The outer surface 100A faces outward in the radiation direction with respect to the rotational axis AX. The inner surface 100B faces the direction opposite to the outer surface 100A. The outer surface 100A and the inner surface 100B are each parallel to the Y axis (rotational axis AX).

The carcass portion 120 is a member (reinforcing member) that forms a framework of the tire 1. The carcass portion 120 includes a cord (reinforcing material). The cord of the carcass portion 120 may be referred to as a carcass cord. The carcass portion 120 is a cord layer (reinforcing material layer) including the cord. The carcass portion 120 functions as a pressure vessel when the tire 1 is filled with gas (air).

Figure 3:
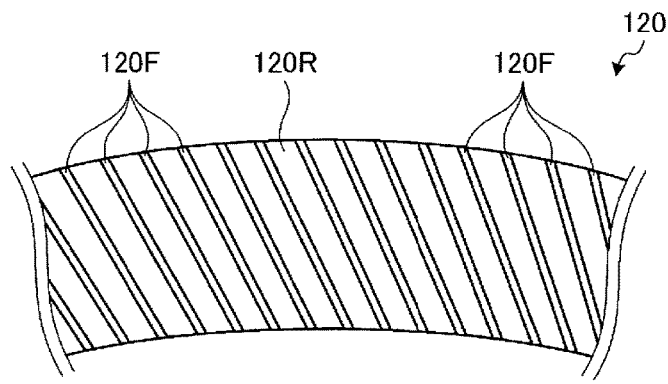
FIG. 3 is a diagram illustrating an example of a carcass portion according to the first embodiment.

FIG. 3 is an enlarged view of a portion of the carcass portion 120. As illustrated in FIG. 3, the carcass portion 120 includes a rubber 120R and cords 120F covered by the rubber 120R. The cords 120F contain organic fibers. The rubber 120R that covers the cords 120F may be referred to as a coating rubber or a topping rubber. Note that the carcass portion 120 may include polyester cords 120F, polyamide cords 120F that contain an aliphatic backbone, polyamide cords 120F that contain only an aromatic backbone, or rayon cords 120F.

As illustrated in FIG. 2, at least a portion of the carcass portion 120 is disposed to the outer side of the annular structure 100 in the Y-axis direction. In the present embodiment, at least a portion of the carcass portion 120 is disposed to the inner surface 100B side of the annular structure 100. At least a portion of the carcass portion 120 is disposed to the inner side of the annular structure 100 in the radiation direction with respect to the rotational axis AX. At least a portion of the carcass portion 120 is disposed facing the inner surface 100B of the annular structure 100. The carcass portion 120 includes an outer surface 120A that faces the inner surface 100B of the annular structure 100. The inner surface 100B of the annular structure 100 comes into contact with at least a portion of the outer surface 120A of the carcass portion 120. The annular structure 100 and the carcass portion 120 are joined together.

The carcass portion 120 is supported by bead portions 2. The bead portions 2 are disposed at both sides of the carcass portion 120 in the Y-axis direction. The carcass portion 120 is folded back at the bead portions 2. The bead portions 2 are members (reinforcing members) that fix both ends of the carcass portion 120 in the Y-axis direction. The bead portions 2 fix the tire 1 to the rim of a wheel. The bead portions 2 are a bundle of steel wires. Note that the bead portions 2 may be a bundle of carbon steel. In the present embodiment, an innerliner 140 is disposed to the inner side of the carcass portion 120. The innerliner 140 inhibits the gas inside the tire 1 from leaking.

The tread rubber layer 11 includes the tread portion 10. The tread rubber layer 11 protects the carcass portion 120. The tread rubber layer 11 is a cylindrical member. At least a portion of the tread rubber layer 11 is disposed around the carcass portion 120. The tread rubber layer 11 has an outer surface 11A and an inner surface 11B. The outer surface 11A faces outward in the radiation direction with respect to the rotational axis AX. The inner surface 11B faces the direction opposite to the outer surface 11A. The outer surface 11A and the inner surface 11B are each parallel to the Y axis (rotational axis AX).

The outer surface 11A is a ground contact surface that comes into contact with the ground. The tread rubber layer 11 includes the ground contact surface (outer surface) 11A that comes into contact with the ground, main grooves 40 formed in at least a portion of the ground contact surface 11A to surround the rotational axis AX, and the inner surface 11B that faces the direction opposite to the ground contact surface 11A. In rainy conditions, and the like, the main grooves 40 are able to remove water (water drainability) from between the tire 1 and the ground as the tire 1 rolls over the ground covered in water. In the present embodiment, the main groove 40 refers to a groove disposed in the tread rubber layer 11 with a depth of 2.5 mm or greater and a width of 4 mm or greater.

The tread rubber layer 11 contains natural rubber, synthetic rubber, carbon black, sulfur, zinc oxide, a crack preventive material, a vulcanization accelerator, and an anti-aging agent.

At least a portion of the tread rubber layer 11 is disposed to the outer surface 100A side of the annular structure 100. At least a portion of the tread rubber layer 11 is disposed to the outer side of the annular structure 100 in the radiation direction with respect to the rotational axis AX. At least a portion of the tread rubber layer 11 is disposed to face the outer surface 100A of the annular structure 100. At least a portion of the inner surface 11B of the tread rubber layer 11 faces the outer surface 100A of the annular structure 100. The outer surface 100A of the annular structure 100 comes into contact with at least a portion of the inner surface 11B of the tread rubber layer 11. The annular structure 100 and the tread rubber layer 11 are joined together.

In the present embodiment, the rotational axis AX, the outer surface 100A of the annular structure 100, the inner surface 100B of the annular structure 100, the ground contact surface 11A of the tread rubber layer 11, and the inner surface 11B of the tread rubber layer 11 are substantially parallel to one another.

Note that in the present embodiment, that the ground contact surface 11A and the outer surface 100A are parallel includes the meaning of the distance from the ground contact surface 11A to the outer surface 100A being uniform in both the circumferential and width direction of the tire 1. In addition, that the ground contact surface 11A and the outer surface 100A are parallel includes the meaning of the difference in the maximum and minimum distance from the ground contact surface 11A to the outer surface 100A being 0.3 mm or less in both the circumferential and width direction of the tire 1. The relationship between the ground contact surface 11A and the inner surface 11B, the relationship between the ground contact surface 11A and the inner surface 100B, the relationship between the inner surface 11B and the outer surface 100A, the relationship between the inner surface 11B and the inner surface 100B, and the relationship between the outer surface 100A and the inner surface 100B are also similar.

The sidewall portions 3 protect the carcass portion 120. The sidewall portions 3 are disposed on both sides of the tread rubber layer 11 in the Y-axis direction.

In the present embodiment, $$SW/OD \leq 0.30 \quad (1A)$$

is satisfied, where SW is a total tire width and OD is a tire outer diameter.

In addition, in the present embodiment, $$0.9 \leq BW/W \leq 1.1 \quad (2A)$$

is satisfied, where W is a ground contact width, which is the width of the ground contact region of the ground contact surface 11A, and BW is a dimension (width) of the annular structure 100 in the Y-axis direction parallel to the rotational axis AX.

More preferably, $$0.95 \leq BW/W \leq 1.05 \quad (2B)$$

is satisfied.

In addition, in the present embodiment, $$0.65 \leq W/SW \leq 0.90 \quad (3A)$$

is satisfied.

More preferably, $$0.70 \leq W/SW \leq 0.80 \quad (3B)$$

is satisfied.

The tire width SW refers to the total width of the tire 1, in other words, the maximum dimension of the tire 1 in the Y-axis direction parallel to the rotational axis AX. In the present embodiment, the tire width SW refers to a distance from the furthest portion (surface) to the +Y side of the sidewall portion 3 disposed to the +Y side of the tread rubber layer 11 to the furthest portion (surface) to the −Y side of the sidewall portion 3 disposed to the −Y side. For example, in the case of a design (marking, component) being provided on the surface of the sidewall portion 3 that is disposed to the +Y side of the tread rubber layer 11 protruding from the surface of this sidewall portion 3 to the +Y side, the furthest portion to the +Y side of the sidewall portion 3 is inclusive of the end portion of the design. In a similar manner, in the case of a design being provided on the surface of the sidewall portion 3 that is disposed to the −Y side of the tread rubber layer 11 protruding from the surface of this sidewall portion 3 to the −Y side, the furthest portion to the −Y side of the sidewall portion 3 is inclusive of the end portion of the design. Specifically, the tire width SW refers to the width from one sidewall portion 3 to the other including any designs located on the sidewall portions 3, when the tire 1 is assembled on a rim, inflated to 230 kPa with air to specify the dimensions of the tire 1, and in an unloaded state.

The tire outer diameter OD refers to the outer diameter of the tire 1, when the tire 1 is assembled on a rim, inflated to 230 kPa with air to specify the dimensions of the tire 1, and in an unloaded state.

The ground contact width W refers to a width of the ground contact region of the ground contact surface 11A, in other words a maximum dimension (maximum width) of the ground contact region in the Y-axis direction parallel to the rotational axis AX. The ground contact region of the ground contact surface 11A refers to a region of the ground contact surface that comes into contact with the ground when the tire 1 is assembled on a rim, inflated to 230 kPa with air to specify the dimensions of the tire 1, and a load corresponding to 80% of the load capacity is applied.

When Formula (1A) is satisfied, in other words when the tire width SW is reduced and thus reducing the forward projection area, the air resistance around the tire 1 is reduced. As a result, fuel economy is improved. In addition, in the present embodiment, because the tire 1 is provided with the annular structure 100, a decrease in steering stability due to the reduced tire width SW is prevented or minimized.

In the present embodiment, because the ground contact surface 11A and the outer surface 100A are each parallel to the rotational axis AX, the stiffness distribution in the tread rubber layer 11 in the width direction is made uniform. As a result, localized deformation in the tread rubber layer 11 is prevented or minimized, and thus rolling resistance is reduced. Accordingly, fuel economy is improved.

In addition, when Formula (2A) is satisfied, the rolling resistance of the tire 1 can be reduced and also favorable steering stability can be achieved. For example, when BW/W is greater than 1.1, steering stability may be reduced. When BW/W is less than 0.9, bending at the end portions of the ground contact region of the ground contact surface 11A is increased. As a result, rolling resistance is increased, and thus fuel economy may not be improved.

In addition, when Formula (3A) is satisfied, the rolling resistance of the tire 1 can be reduced and also favorable steering stability can be achieved. For example, when W/SW is greater than 0.90, the ground contact region is larger, and thus deformation of the ground contact surface 11A is increased. As a result, the rolling resistance of the tire 1 is not sufficiently reduced. When W/SW is less than 0.65, steering stability is reduced.

In addition, in the present embodiment, $$0.14 \times (OD-RD)/2SW + 0.65 \leq W/SW \leq 0.14 \times (OD-RD)/2SW + 0.76 \quad (4A)$$

is satisfied, where RD is a tire rim diameter (inner diameter).

The aspect ratio of the tire 1 is (OD−RD)/2SW. Formula (4A) shows that W/SW is varied depending upon the aspect ratio. To maintain rolling resistance and also efficiently improve steering stability, in the present embodiment, the ground contact width W is specified in accordance with the aspect ratio. The tire 1 in which (OD−RD)/2SW is a low value (low aspect ratio) has superior steering stability compared to the tire 1 in which (OD−RD)/2SW is a high value (high aspect ratio). Thus, by reducing the ground contact width W accordingly, rolling resistance can be maintained and also a decrease in steering stability can be prevented or minimized.

In addition, in the present embodiment, $$0.05 \leq Tu/T1 \leq 0.15 \quad (5A)$$

is satisfied, where T1 is a thickness of the tread rubber layer 11, specifically a distance from ground contact surface 11A to the inner surface 11B, and Tu is a thickness of the tread rubber layer 11, specifically a distance from a bottom surface 40B of the main groove 40 to the inner surface 11B.

More preferably, $$0.08 \leq Tu/T1 \leq 0.12 \quad (5B)$$

is satisfied.

The thickness T1 and the thickness Tu are dimensions in the Z-axis direction orthogonal to the rotational axis AX. In other words, the thickness T1 and the thickness Tu are vertical thicknesses.

In the present embodiment, the rigidity of the tire 1 is increased by the annular structure 100. Accordingly, even when the thickness Tu relative to the thickness T1 of the tread rubber layer 11 is thin as represented in Formula (5A), formation of cracks in the tread rubber layer 11 is prevented or minimized. In addition, by specifying the thickness T1 and the thickness Tu of the tread rubber layer 11 as represented in Formula (5A), water drainage properties can be reduced and also favorable steering stability can be maintained. For example, the desired dynamic characteristics of the tire 1 such as cornering characteristics can be achieved. Rolling resistance can also be effectively reduced.

Note that in the present embodiment, the annular structure 100 is covered by at least any one of: a rubber layer including the tread rubber layer 11 and the sidewall portions 3, a surface treating agent, and an adhesive agent. In other words, in the tire 1 according to the present embodiment, the annular structure 100 is not exposed.

Figure 4:
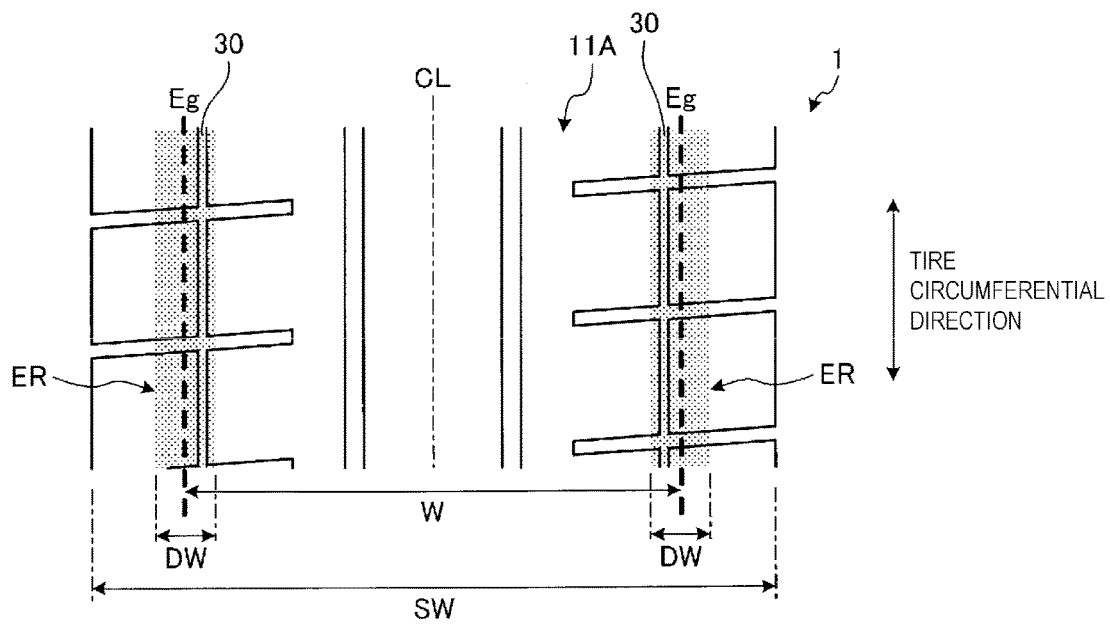
FIG. 4 is a diagram illustrating an example of a tread portion according to the first embodiment.

FIG. 4 is a diagram (planar development diagram) illustrating an example of the ground contact surface 11A of the tire 1. The tread rubber layer 11 includes an edge region ER which includes an edge portion Eg of the ground contact region of the ground contact surface 11A in the Y-axis direction parallel to the rotational axis AX. The center position of the edge region ER is aligned with the edge portion Eg of the ground contact region in the Y-axis direction parallel to the rotational axis AX. The tread rubber layer 11 includes narrow grooves 30 formed in the edge region ER. The narrow grooves 30 are formed to surround the rotational axis AX. The narrow grooves 30 have a width less than that of the main grooves 40. The width of the main grooves 40 and the narrow grooves 30 is a dimension in the Y-axis direction. In the present embodiment, the narrow groove 30 refers to a groove disposed in the tread rubber layer 11 with a width of from 2 mm to 4 mm, both inclusive.

In the present embodiment, $$DW=0.1W \qquad (6A)$$

is satisfied, where DW is a width of the edge region ER.

In the case of the tire 1 being provided with the annular structure 100, strain of the tread rubber layer 11 at the edge portion Rg or in proximity thereto may increase. Accordingly, by disposing the narrow grooves 30 parallel to the tire equator line CL in the edge region ER that includes the edge portion Rg as represented in Formula (6A), rolling resistance can be reduced, and thus fuel economy improved.

Figure 5:
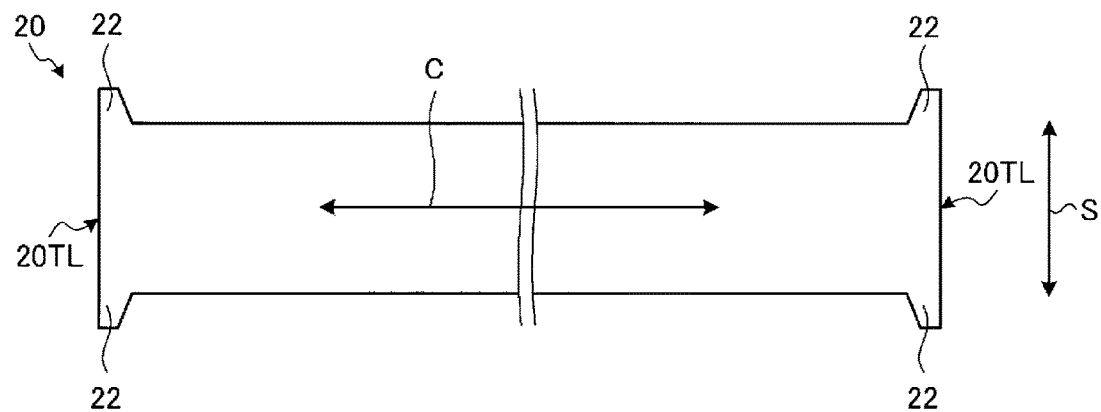
FIG. 5 is a diagram for describing an example of a method of manufacturing an annular structure according to the first embodiment.
Figure 6:
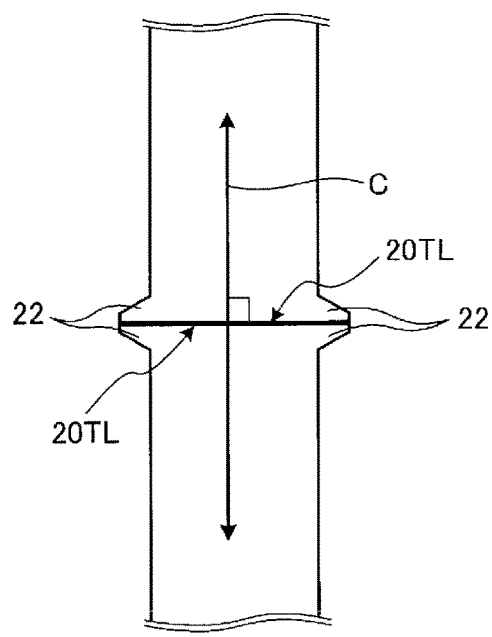
FIG. 6 is a diagram for describing an example of the method of manufacturing the annular structure according to the first embodiment.
Figure 7:
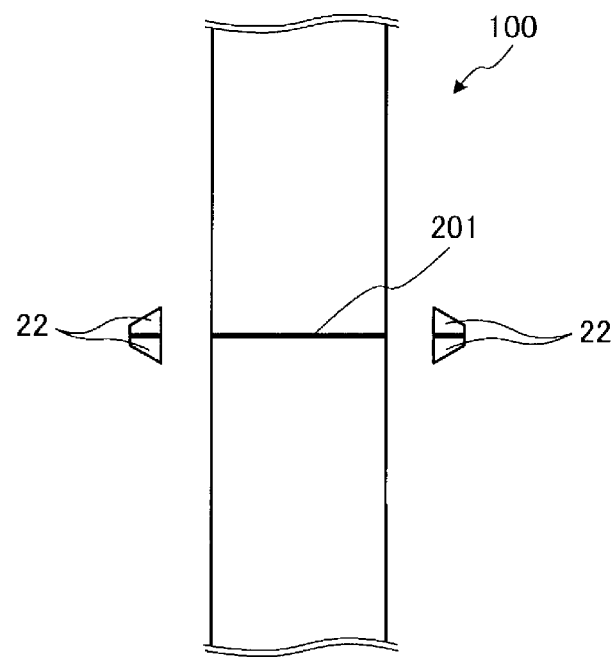
FIG. 7 is a diagram for describing an example of the method of manufacturing the annular structure according to the first embodiment.

Next, an example of a method of manufacturing the annular structure 100 according to the present embodiment is described. FIG. 5, FIG. 6, and FIG. 7 are views of the example of the method of manufacturing the annular structure 100. As illustrated in FIG. 5, a strip-shaped (rectangular) metal plate 20 is prepared. The plate 20 includes protrusions 22 protruding from both sides in the transverse direction (see arrow S) located at both a first end portion 20TL and a second end portion 20TL in the longitudinal direction (see arrow C).

Next, as illustrated in FIG. 6, the end portions 20TL of the plates 20 in the longitudinal direction are abutted, and then bonded together by welding. The end portion 20TL is preferably orientated orthogonal to the longitudinal direction of the plate 20. Types of welding that can be used include gas welding (oxyacetylene welding), arc welding, tungsten inert gas (TIG) welding, plasma welding, metal inert gas (MIG) welding, electroslag welding, electron beam welding, laser beam welding, ultrasonic welding, and the like. In such a manner, the annular structure 100 can be easily manufactured by welding the end portions 20TL of the plates 20 together. Note that after being welded, the plate 20 may be subjected to any one of: heat treatment and rolling. Such treatment improves the strength of the annular structure 100. For example, when using precipitation hardening stainless steel, heat treatment may include heating at 500° C. for 60 minutes. The conditions of the heat treatment are not limited to the foregoing, and can be modified as necessary based on the desired characteristics.

Next, as illustrated in FIG. 7, the post-welding protrusions 22 are removed. Thus, the annular structure 100 is formed. Note that in the case of subjecting the annular structure 100 to heat treatment, heat treatment is preferably performed after the protrusions 22 are removed. Because heat treatment strengthens the annular structure 100, the protrusions 22 are more easily removed before heat treatment and the like is performed. After the annular structure 100 is formed, an unvulcanized tread rubber layer 11 is disposed around the outer side of the annular structure 100. The carcass portion 120 is also attached to the annular structure 100. Thus, a green tire is formed. Thereafter, the green tire is vulcanized, and the tread rubber layer 11 and the annular structure 100 are joined, thereby forming the tire 1.

Figure 8:
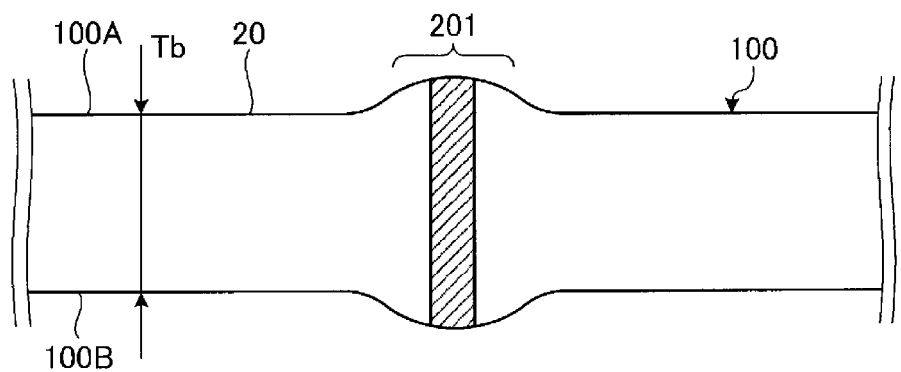
FIG. 8 is a diagram illustrating an example of a region around a welded portion of the annular structure according to the first embodiment.

FIG. 8 is a side view of the region around the welded portion 201 of the annular structure 100 bonded by welding. As illustrated in FIG. 8, the welded portion 201 has a thickness greater than a thickness Tb of the portions around the welded portion 201. The thickness Tb of the surrounding portions corresponds to the thickness Tb of the plate 20. The thickness Tb is the thickness of the annular structure 100 at portions disregarding the portion where the welded portion 201 is formed. The thickness Tb also means the distance from the outer surface 100A to the inner surface 100B.

As described above, the annular structure 100 is manufactured using a metal material. In the present embodiment, $$150 \text{ GPa} \leq E \leq 250 \text{ GPa} \qquad (7A)$$

is satisfied, where E is the Young's modulus of the metal material constituting the annular structure 100 (plate 20).

More preferably, $$170 \text{ GPa} \leq E \leq 210 \text{ GPa} \qquad (7B)$$

is satisfied.

In addition, in the present embodiment, $$0.2 \text{ mm} \leq Tb \leq 0.8 \text{ mm} \qquad (8A)$$

is satisfied, where Tb is the thickness of the plate 20.

More preferably, $$0.4 \text{ mm} \leq Tb \times 0.6 \text{ mm} \qquad (8B)$$

is satisfied.

In the present embodiment, the tensile strength of the metal material of the annular structure 100 is from 900 MPa to 1800 MPa, both inclusive.

The tire 1 in which Formula (7A) and Formula (8A) are satisfied has its rolling resistance reduced and durability maintained. Steering stability is also improved. In addition, because the tire 1 has a large outer diameter, the annular structure 100 with comparatively high rigidity is preferably applied.

When the Young's modulus E is less than 150 GPa, the deformation at the ground contact region of the tread rubber layer 11 increases, and thus rolling resistance is difficult to decrease. When the Young's modulus E is greater than 250 GPa, flexural rigidity increases, and thus the area of the ground contact region decreases and ground contact pressure increases. As a result, rolling resistance is difficult to decrease. In addition, the effects of improving steering stability are reduced by the lack of sufficient area of the ground contact region.

When the thickness Tb is less than 0.2 mm, deformation at the ground contact region of the tread rubber layer 11 increases, and thus rolling resistance is difficult to decrease. In addition, by decreasing the thickness Tb, sufficient durability may be unable to be obtained. When the thickness Tb is greater than 0.8 mm, flexural rigidity increases, and thus the area of the ground contact region decreases and ground contact pressure increases. As a result, rolling resistance is difficult to decrease. In addition, the effects of improving steering stability are reduced by the lack of sufficient area of the ground contact region.

The annular structure 100 may contain at least one of: spring steel, high-tensile steel, stainless steel, and titanium. The titanium may contain a titanium alloy. In the present embodiment, the annular structure 100 contains stainless steel. Stainless steel has a high corrosion resistance. With stainless steel, the above-described values of the Young's modulus E and the tensile strength can be obtained.

When manufacturing the annular structure 100 from the stainless steel, at least one of Japanese Industrial Standards (JIS) G4303-classified: martensitic stainless steel, ferritic stainless steel, austenitic stainless steel, austenitic-ferritic two-phase stainless steel, and precipitation hardening stainless steel may be used. By using such stainless steel, the annular structure 100 having a high tensile strength and toughness is able to be manufactured.

Next, Working Examples according to the present technology are described. The present inventors manufactured tires 1 according to the embodiment described above and performed evaluation tests on the tires 1 in regard to fuel economy index and steering stability. In addition, tires according to Conventional Example and Comparative Example 1 were manufactured, and also evaluation tests on the tires in regard to fuel economy index and steering stability were performed.

The evaluation test for fuel economy index was performed by mounting the tires on a compact front-wheel drive vehicle with an engine displacement of 1500 cc, and driving the vehicle for 50 laps on a 2 km long test course at a speed of 100 km/h. The fuel economy improvement rate was measured relative to the fuel consumption rate of the tires of Comparative Example (reference tire), Comparative Example being assigned a reference value of 100. Larger index values indicate better fuel economy.

The evaluation test for steering stability was performed by assembling the tires on a standard rim and mounting the tires on a passenger vehicle with an engine displacement of 1500 cc, and driving the vehicle for 3 laps of a 1 km test course while changing lanes. Ride feeling while driving was evaluated by three specialist drivers. The averaged evaluation score of each tire was expressed as an index value of the evaluation score based on the reference value of 100 of the averaged ride feeling evaluation score of the tire (reference tire) of Comparative Example. Larger evaluation values indicate superior steering stability.

In Table 1, the results of the evaluation tests are shown for the tires 1 according to Working Examples 1 to 6 of the present technology and for the tires (reference tires) according to Conventional Example and Comparative Example 1. In Conventional Example, SW/OD was 0.32. In Comparative Example 1, SW/OD was 0.24. In Working Examples 1 to 6, SW/OD was 0.24.

TABLE 1

| | Conventional Example | Comparative Example 1 | Working Example 1 | Working Example 2 |
|---|---|---|---|---|
| SW (mm) | 205 | 165 | 165 | 165 |
| Aspect ratio | 55 | 55 | 55 | 55 |
| RD (inch) | 16 | 20 | 20 | 20 |
| OD (mm) | 632 | 695 | 695 | 695 |
| SW/OD | 0.32 | 0.24 | 0.24 | 0.24 |
| Annular structure | Absent | Absent | Present | Present |
| Ground contact surface and annular structure parallel with rotational axis? | — | — | No | Yes |
| BW/W | 0.98 | 0.98 | 0.98 | 0.85 |
| W/SW | 0.82 | 0.82 | 0.82 | 0.82 |
| Fuel economy index | 100 | 101.5 | 102.5 | 102.0 |
| Steering stability | 100 | 90 | 100 | 100 |

| | Working Example 3 | Working Example 4 | Working Example 5 | Working Example 6 |
|---|---|---|---|---|
| SW (mm) | 165 | 165 | 165 | 165 |
| Aspect ratio | 55 | 55 | 55 | 55 |
| RD (inch) | 20 | 20 | 20 | 20 |
| OD (mm) | 695 | 695 | 695 | 695 |
| SW/OD | 0.24 | 0.24 | 0.24 | 0.24 |
| Annular structure | Present | Present | Present | Present |
| Ground contact surface and annular structure parallel with rotational axis? | Yes | Yes | Yes | Yes |
| BW/W | 1.00 | 1.00 | 1.00 | 1.00 |
| W/SW | 0.60 | 0.92 | 0.87 | 0.78 |
| Fuel economy index | 102.5 | 102.0 | 102.5 | 103.0 |
| Steering stability | 100 | 110 | 105 | 105 |

In Table 1, that "Annular structure" is "Absent" means the belt layer is a conventional belt layer with arranged cords. That "Annular structure" is "Present" means the belt layer is the annular structure 100 according to the present technology. In other words, in Table 1, the tires according to Conventional Example and Comparative Example 1 did not include the annular structure 100 according to the present technology. The tires according to Working Examples 1 to 6 included the annular structure 100 according to the present technology. The tires of Conventional Example and Comparative Example 1 included a typically used belt layer with arranged cords instead of the annular structure 100.

In Table 1, that "Ground contact surface and annular structure parallel with rotational axis?" is "Yes" means the ground contact surface 11A of the tread portion 10 and the outer surface 100A of the annular structure 100 are both parallel to the rotational axis AX. That "Ground contact surface and annular structure parallel with rotational axis?" is "No" means the ground contact surface 11A of the tread portion 10 and the outer surface 100A of the annular structure 100 are both non-parallel to the rotational axis AX.

As shown in Table 1, Formula (2A), Formula (3A), and Formula (4A) were satisfied in Conventional Example, however Formula (1A) was not satisfied. In addition, Conventional Example did not include the annular structure 100.

For Comparative Example 1, Formula (1A), Formula (2A), Formula (3A), and Formula (4A) were satisfied, however the annular structure 100 was not provided.

Formula (1A), Formula (2A), Formula (3A), and Formula (4A) were satisfied in Working Example 1. In addition, in Working Example 1, the ground contact surface 11A of the tread portion 10 and the outer surface 100A of the annular structure 100 were both non-parallel to the rotational axis AX.

Formula (1A), Formula (3A), and Formula (4A) were satisfied in Working Example 2, however Formula (2A) was not satisfied. In addition, in Working Example 2, the ground contact surface 11A of the tread portion 10 and the outer surface 100A of the annular structure 100 were both parallel to the rotational axis AX.

Formula (1A) and Formula (2A) were satisfied in Working Example 3, however Formula (3A) and Formula (4A) were not satisfied. In Working Example 3, W/SW was 0.6. In addition, in Working Example 3, the ground contact surface 11A of the tread portion 10 and the outer surface 100A of the annular structure 100 were both parallel to the rotational axis AX.

Formula (1A) and Formula (2A) were satisfied in Working Example 4, however Formula (3A) and Formula (4A) were not satisfied. In Working Example 4, W/SW was 0.92. In addition, in Working Example 4, the ground contact surface 11A of the tread portion 10 and the outer surface 100A of the annular structure 100 were both parallel to the rotational axis AX.

Formula (1A), Formula (2A), and Formula (3A) were satisfied in Working Example 5, however Formula (4A) was not satisfied. In addition, in Working Example 5, the ground contact surface 11A of the tread portion 10 and the outer surface 100A of the annular structure 100 were both parallel to the rotational axis AX.

Formula (1A), Formula (2A), Formula (3A), and Formula (4A) were satisfied in Working Example 6. In addition, in Working Example 5, the ground contact surface 11A of the tread portion 10 and the outer surface 100A of the annular structure 100 were both parallel to the rotational axis AX.

As shown in Table 1, the tires 1 according to Working Examples 1 to 6 in which Formula (1A) was satisfied had better fuel economy indices than those of tires according to Conventional Example and Comparative Example 1.

As shown in Table 1, the tires 1 according to Working Examples 1 to 6 in which Formula (1A) was satisfied had better steering stability than the tire according to Comparative Example 1.

As shown in Table 1, Working Examples 1 to 6 in which the annular structure 100 was provided had better fuel economy indices than Conventional Example and Comparative Example 1 in which the annular structure 100 was not provided.

As shown in Table 1, Working Examples 1 to 6 in which the annular structure 100 was provided had the same or better steering stability as Conventional Example and Comparative Example 1 in which the annular structure 100 was not provided.

As described above, according to the present embodiment, the tires 1 provided with the annular structure 100 and having the ratio between the tire width SW and the tire outer diameter OD specified to satisfy Formula (1A) are capable of reducing the rolling resistance of the tire 1, and thus improving fuel economy. In addition, the tire 1 provided with the annular structure 100 can prevent or minimize a decrease in steering stability. In such a manner, according to the present embodiment, the tire 1 meeting the desired dynamic characteristics can be achieved.

In addition, in the present embodiment, because the ground contact surface 11A and the outer surface 100A are each parallel to the rotational axis AX, the stiffness distribution in the tread rubber layer 11 in the width direction is made uniform. As a result, localized deformation in the tread rubber layer 11 is prevented or minimized, and thus rolling resistance is reduced. Accordingly, fuel economy is improved.

In addition, in the present embodiment, the ratio between the ground contact width W and the width BW of the annular structure 100 is specified to satisfy Formula (2A). As a result, the rolling resistance of the tire 1 is reduced, and thus favorable steering stability can be achieved.

In the present embodiment, the ratio between the ground contact width W and the tire width SW is specified to satisfy Formula (3A). As a result, the rolling resistance of the tire 1 is reduced, and thus favorable steering stability can be achieved.

In the present embodiment, as represented in Formula (4A), W/SW is varied depending upon the aspect ratio (OD−RD)/2SW of the tire 1. As a result, rolling resistance can be maintained and steering stability can be efficiently improved. The tire 1 with a low aspect ratio has superior steering stability compared to the tire 1 with a high aspect ratio. Therefore, by reducing the ground contact width W accordingly, rolling resistance can be maintained and also a decrease in steering stability can be prevented or minimized.

In addition, according to the present embodiment, the ratio between the thickness T1 and the thickness Tu of the tread rubber layer 11 is specified to satisfy Formula (5A). As a result, with the thickness of the tread rubber layer 11 suppressed, the generation of cracks in the tread rubber layer 11 can be prevented or minimized and the desired dynamic characteristics of the tire 1 can be met.

According to the present embodiment, by disposing the narrow grooves 30 parallel to the tire equator line CL in the edge region ER that has the width DW as represented in Formula (6A), rolling resistance can be reduced, and thus fuel economy can be improved.

In addition, according to the present embodiment, the Young's modulus E and the thickness Tb of the annular structure 100 are specified to satisfy Formula (7A) and Formula (8A), respectively. As a result, the rolling resistance of the tire 1 is reduced, and thus durability of the tire 1 is ensured.

Second Embodiment

A second embodiment is described. In the description below, identical or substantially similar constituent portions to those of the above-described embodiment are assigned with the same reference numbers, and descriptions of those constituent portions are either simplified or omitted. In the embodiments described below, examples of the annular structure are described.

Figure 9:
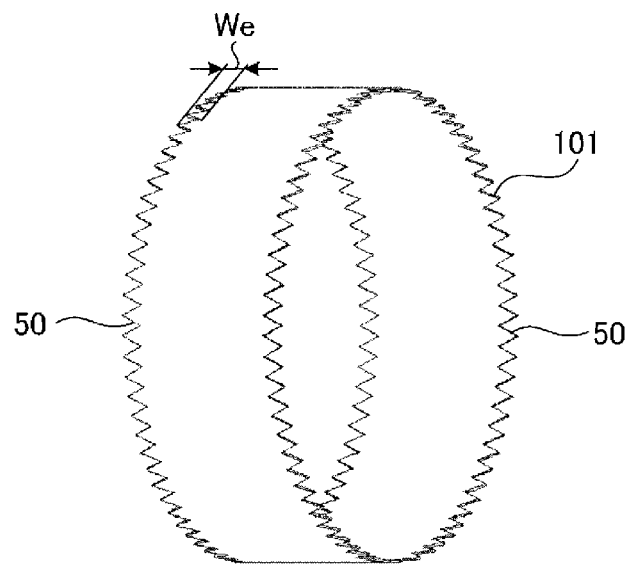
FIG. 9 is a diagram schematically illustrating an example of an annular structure according to a second embodiment.

FIG. 9 is a perspective view illustrating an example of an annular structure 101 according to the present embodiment. As illustrated in FIG. 9, the annular structure 101 includes a recess and protrusion portion 50 on at least a portion of the ends in the width direction (direction parallel to the rotational axis AX) of the annular structure 101. The recess and protrusion portion 50 is provided on both sides of the annular structure 101 in the width direction. The protrusions of the recess and protrusion portion 50 are pointed. The recess and protrusion portion 50 forms a so-called saw blade shape. In the present embodiment, the dimension We of the recess and protrusion portion 50 in the width direction is from 5 mm to 40 mm, both inclusive.

When at least a portion of the tread rubber layer 11 is disposed on each side of the annular structure 101 in the width direction, the recess and protrusion portion 50 can bite into the tread rubber layer 11. As a result, joining between the annular structure 101 and the tread rubber layer 11 is strengthened.

In addition, by providing the recess and protrusion portion 50, a sudden change in rigidity at the end portions of the tire 1 in the width direction is prevented or minimized. This is particularly effective when the annular structure 101 has a small width.

The annular structure 101 is cylindrical, and thus in spite of easily deforming in the radiation direction with respect to the rotational axis AX (bends easily in the Z-axis direction), the annular structure 101 does not easily deform in the direction parallel to the rotational axis AX (high rigidity). Accordingly, rigidity may be unbalanced with respect to the direction parallel to the rotational axis AX. In the present embodiment, because the recess and protrusion portion 50 is provided, the annular structure 101 easily deforms in the direction parallel to the rotational axis AX. Accordingly, rigidity unbalance is prevented or minimized.

Third Embodiment

Figure 10:
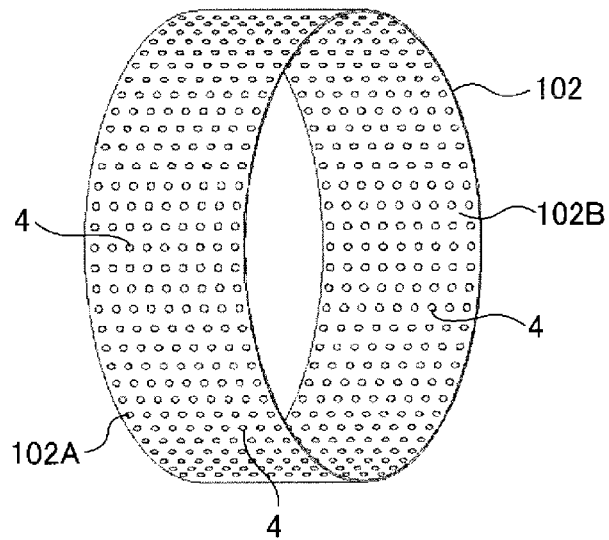
FIG. 10 is a diagram schematically illustrating an example of an annular structure according to a third embodiment.

A third embodiment is described. FIG. 10 is a perspective view illustrating an example of an annular structure 102 according to the present embodiment. In FIG. 10, the annular structure 102 has an outer surface 102A, an inner surface 102B, and a plurality of through holes 4 that penetrate the outer surface 102A and the inner surface 102B.

In the present embodiment, the through holes 4 are disposed with an equal interval between one another in the width direction of the annular structure 102. Furthermore, the through holes 4 are disposed with an equal interval between one another in the circumferential direction of the annular structure 102. The through holes 4 are formed at an equal density in both the width direction and the circumferential direction of the annular structure 102.

In the present embodiment, at least a portion of the tread rubber layer 11, which is bonded to the outer surface 102A of the annular structure 102, can come into contact with the carcass portion 120, which is bonded to the inner surface 102B of the annular structure 102, via the through holes 4. When the adhesive agent (adhesive layer) is provided on at least one of: the inner surface 11B of the tread rubber layer 11 and the outer surface 120A of the carcass portion 120, at least a portion of the inner surface 11B of the tread rubber layer 11 and the outer surface 120A of the carcass portion 120 are bonded together by the adhesive agent (adhesive layer) via the through holes 4. As a result, joining between the tread rubber layer 11 and the annular structure 102 and joining between the annular structure 102 and the carcass portion 120 are each strengthened, and thus durability of the tire 1 is improved.

In addition, rigidity of the annular structure 102 is adjustable by means of the through holes 4. For example, by adjusting the number of through holes 4 or the size of the through holes 4, rigidity of the annular structure 102 can be adjusted. For example, by means of the through holes 4, cornering power is prevented from being excessive, and thus steering stability is improved.

Fourth Embodiment

Figure 11:
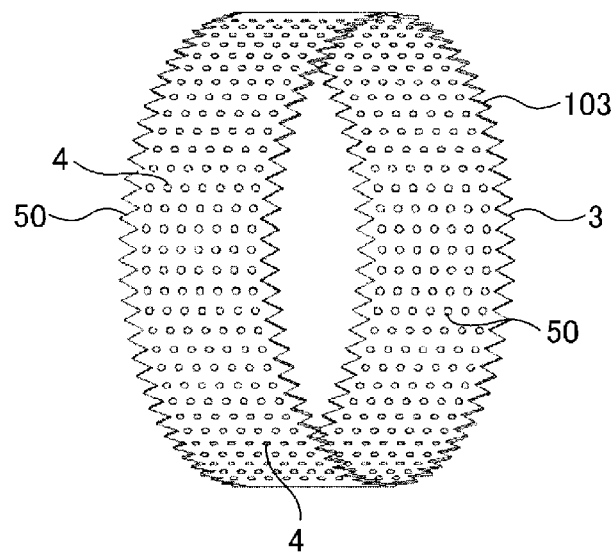
FIG. 11 is a diagram schematically illustrating an example of an annular structure according to a fourth embodiment.

A fourth embodiment is described. FIG. 11 is a perspective view illustrating an example of an annular structure 103 according to the present embodiment. In FIG. 11, the annular structure 103 includes the recess and protrusion portion 50 and the plurality of through holes 4. The constituents described with reference to FIG. 9 and the constituents described with reference to FIG. 10 may be combined in this manner.

Fifth Embodiment

Figure 12:
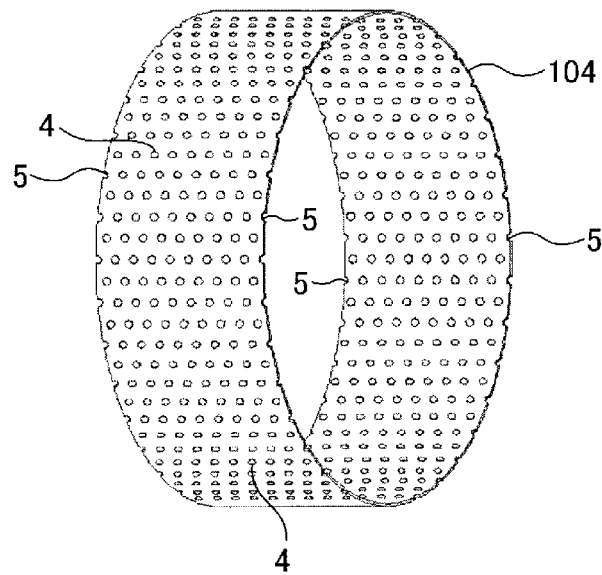
FIG. 12 is a diagram schematically illustrating an example of an annular structure according to a fifth embodiment.

A fifth embodiment is described. FIG. 12 is a perspective view illustrating an example of an annular structure 104 according to the present embodiment. In FIG. 12, the annular structure 104 includes the plurality of through holes 4. Further, the annular structure 104 includes recesses 5. The recesses 5 may be referred to as a notched portion 5. The recesses 5 are provided on each side of the annular structure 104 in the width direction. The recesses 5 are disposed with an interval between one another in the circumferential direction of the annular structure 104. When at least a portion of the tread rubber layer 11 is disposed on each side of the annular structure 104 in the width direction, at least a portion of the tread rubber layer 11 can be wedged into the recesses 5. As a result, the joining between the annular structure 104 and the tread rubber layer 11 is strengthened.

Sixth Embodiment

Figure 13:
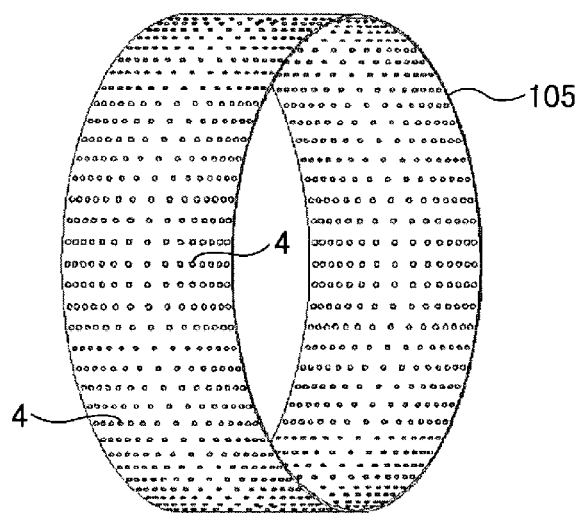
FIG. 13 is a diagram schematically illustrating an example of an annular structure according to a sixth embodiment.

A sixth embodiment is described. FIG. 13 is a perspective view illustrating an example of an annular structure 105 according to the present embodiment. In FIG. 13, the annular structure 105 includes the plurality of through holes 4. Further, the through holes 4 are disposed with an equal interval between one another in the circumferential direction of the annular structure 105. The through holes 4 are disposed with an interval between one another in the width direction of the annular structure 105. Furthermore, the through holes 4 are disposed with an unequal interval between one another in the width direction of the annular structure 105. In the present embodiment, in the width direction of the annular structure 105, the interval between the through holes 4 disposed in proximity to the edges of the annular structure 105 is smaller than the interval between the through holes 4 disposed in a central region of the annular structure 105. Note that, in the width direction of the annular structure 105, the interval between the through holes 4 disposed in proximity to the edges of the annular structure 105 may be larger than the interval between the through holes 4 disposed in the central region of the annular structure 105.

In the present embodiment also, by means of the through holes 4, joining between the tread rubber layer 11 and the annular structure 105 and joining between the annular structure 105 and the carcass portion 120 are each strengthened.

Seventh Embodiment

A seventh embodiment is described. In the description below, identical or substantially similar constituent portions to those of the above-described embodiments are assigned with the same reference numbers, and descriptions of those constituent portions are either simplified or omitted.

In the description below, tire radial direction refers to the direction orthogonal to the rotational axis AX of the pneumatic tire 1. Tire circumferential direction refers to the direction of rotation about the rotational axis AX (see FIG. 14). In addition, tire width direction refers to the direction parallel to the tire rotational axis AX. Tire equatorial plane CL refers to a plane that is orthogonal to the rotational axis AX of the pneumatic tire 1 and that passes through a center in the tire width direction of the pneumatic tire 1. Tire equatorial line refers to a line along the tire circumferential direction of the pneumatic tire 1 that lies on the tire equatorial plane CL. In the present specification and drawings, the tire equatorial line uses the same reference sign CL as the tire equatorial plane.

The pneumatic tire 1 of the present embodiment is provided with the pair of bead portions 2, the sidewall portions 3 connected to the bead portions, and the tread portion 10 connecting the sidewall portions when viewed in a meridian cross-section.

Note that in the present technology, the internal structure of the pneumatic tire is not particularly limited. The internal structure of the pneumatic tire differs depending upon desired performance and design for the pneumatic tire and is preferably determined via testing, simulations, and the like to satisfy various demands.

The pneumatic tire 1 of the present embodiment is formed so that the ratio between the total width (nominal width) SW and the outer diameter OD of the pneumatic tire 1 satisfies the relationship:

$$SW/OD \leq 0.3 \qquad <1>$$

Formula <1> is equivalent to Formula (1A).

Note that in the present technology, the total width SW is the width from one sidewall portion to the other including any designs located on the sidewall portion, when the pneumatic tire 1 is assembled on a rim, inflated to 230 kPa (discretionarily set internal pressure) to specify the dimensions of the pneumatic tire 1, and is in an unloaded state. The outer diameter OD is the outer diameter of the tire at this time. Note that the internal pressure of 230 kPa described above is selected for the purpose of specifying the dimensions of the pneumatic tire. Thus it should be understood that inflating to an internal pressure of 230 kPa is not necessary for the application of the present technology, and the pneumatic tire 1 according to the present technology inflated to an internal pressure in the typically used range exhibits the effects of the present technology.

The rim used in the present technology has a rim diameter compatible with the inner diameter of the pneumatic tire 1, and has a nominal rim width corresponding to the specified rim width Rm (mm) shown in Table 2 and Table 3 that is the closest value (Rm=K1×Sn) obtained from the product of the nominal tire section width Sn and the coefficient K1 determined according to the aspect ratio, described in the correspondence table (Table 1), of the tire assembled on the rim, in accordance with ISO 4000-1:2001.

TABLE 2

| Aspect ratio | K1 |
| --- | --- |
| 20-25 | 0.92 |
| 30-40 | 0.90 |
| 45 | 0.85 |
| 50-55 | 0.80 |
| 60-70 | 0.75 |
| 75-95 | 0.70 |

TABLE 3

| Nominal rim width | Rm (mm) |
| --- | --- |
| 3 | 76.2 |
| 3.5 | 88.9 |
| 4 | 101.6 |
| 4.5 | 114.3 |
| 5 | 127 |
| 5.5 | 139.7 |
| 6 | 152.4 |
| 6.5 | 165.1 |
| 7 | 177.8 |
| 7.5 | 190.5 |
| 8 | 203.2 |
| 8.5 | 215.9 |
| 9 | 228.6 |
| 9.5 | 241.3 |
| 10 | 254 |

Figure 14:
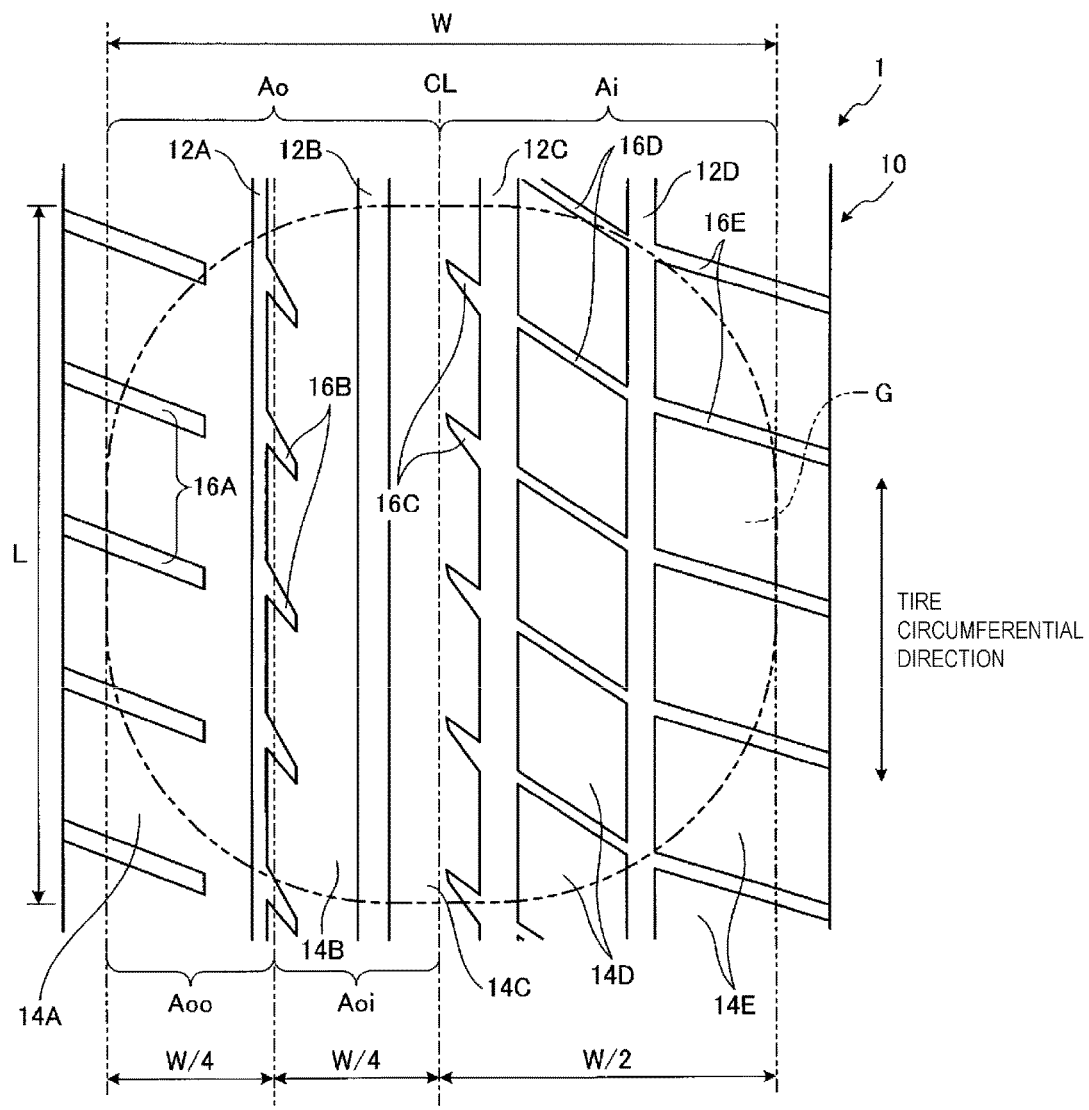
FIG. 14 is a planar development diagram illustrating a portion of a tread portion of a pneumatic tire according to a seventh embodiment.

FIG. 14 is a planar development view illustrating a portion of the tread portion 10 of the pneumatic tire 1 according to an embodiment of the present technology. In FIG. 14, the description of the pneumatic tire 1 assumes that the side to the right of the tire equator line CL is the vehicle side when mounted on a vehicle, and the side to the left of the tire equator line CL is the side opposite to the vehicle side when mounted on a vehicle. In other words, in the description of the present specification and drawings, the pneumatic tire 1 is mounted on the left side of the vehicle.

In the tread portion 10 of the pneumatic tire 1 of the present embodiment, four circumferential grooves 12A, 12B, 12C, 12D extending in the circumferential direction and land portions 14A, 14B, 14C, 14D, 14E defined by the circumferential grooves 12A, 12B, 12C, 12D are formed. In the land portions 14A, 14B, 14C, 14D, 14E, lateral grooves 16A, 16B, 16C, 16D, 16E are respectively formed. The lateral grooves 16A, 16B, 16C, 16D, 16E are grooves 12, 16 disposed to traverse the tire circumferential direction in the tread portion 10, which are distinct from the circumferential grooves 12A, 12B, 12C, 12D. Note that in the present specification, the circumferential grooves 12 and the lateral grooves 16 are collectively referred to as grooves 12, 16, and in the present technology, the circumferential grooves 16 are grooves with a width from 1.5 to 8 mm, both inclusive. As illustrated in FIG. 14, the configuration of the grooves 12, 16 and the land portions 14 form an asymmetrical pattern on the tread portion 10.

The pneumatic tire 1 of the present embodiment is formed so that in the ground contact region G of the tread portion 10, the groove area ratio GR of the ground contact area, the ground contact groove area ratio GRi of the tire inside region Ai, and the ground contact groove area ratio GRo of the tire outside region Ao satisfy the following relationships:

$$10(\%) \leq GR \leq 25(\%) \qquad <2>$$

$$GRo < GRi \qquad <3>$$

$$0.1 \leq (GRi-GRo)/GR \leq 0.6 \qquad <4>$$

In the present technology, the ground contact region G refers to the region of the ground contact surface that comes into contact with the ground when the pneumatic tire 1 is assembled on the rim described above, inflated to an internal pressure of 230 kPa, and a load corresponding to 80% of the load capacity is applied. Ground contact width W refers to the maximum width within the ground contact region in the tire width direction. Ground contact length L refers to the maximum length within the ground contact region in the tire circumferential direction. In addition, in the present technology, load capacity is determined in accordance with ISO 4000-1:1994. For a size for which the load capacity index is not set in the ISO standard described above, the load capacity can be determined by a separate calculation taking into consideration conformity with the standards of each country, and in this case, the load capacity is calculated based on the standards of each country. Therefore, in the present technology, the load capacity for each tire size is calculated from the following calculation equation (c), which is published in "Calculation of Load Capacity" in the commentary to JIS D 4202-1994, which is the actual load capacity calculation equation used in the JIS standard.

$$X = K \times 2.735 \times 10-5 \times p^{0.585} \times Sd^{1.39} \times (D_R - 12.7 + Sd)$$

where X=load capacity (kg)
K=1.36
P=230 (=air pressure (kPa))
$Sd = 0.93 \times S_{0.75} - 0.637d$
$S_{0.75} = S \times ((180° - \mathrm{Sin}^{-1}((Rm/S))/131.4°$
S=design cross-sectional width (mm)

$R_m$ = rim width corresponding to the design cross-sectional width (mm)

d = (0.9 − aspect ratio (−)) × $S_{0.75}$ − 6.35

$D_R$ = reference value for the rim diameter (mm)

In addition, the groove area ratio GR refers to the ratio of the groove area to the sum of the land portion area and the groove area within the ground contact region G (=ground contact area).

Furthermore, as illustrated in FIG. 14, the tire inside region Ai refers to a region within the ground contact region G located to the vehicle side of the tire equator line CL having half the width of the ground contact width W when the tire 1 is mounted on a vehicle. The tire outside region Ao refers to a region within the ground contact region located to the side of the tire equator line CL opposite the vehicle side having half the width of the ground contact width W. The ground contact groove area ratio GRi in the tire inside region Ai is the ratio of the groove area to the sum of the land portion area and the groove area in the tire inside region Ai. The ground contact groove area ratio GRo in the tire outside region Ao is the ratio of the groove area to the sum of the land portion area and the groove area in the tire outside region Ao.

According to the pneumatic tire 1 of the present embodiment, the following actions and effects can be obtained.

(1) The pneumatic tire 1 according to the present embodiment is formed so that the ratio between the total width SW and the outer diameter OD satisfies the relationship in formula <1>. Accordingly, the total width SW relative to the outer diameter OD is small compared to a pneumatic tire of a typical size (for example, 205/55R16 (SW/OD=0.32)). As a result, the forward projection area of the pneumatic tire 1 is smaller, and thus the air resistance around the tire is reduced and the rolling resistance of the pneumatic tire 1 can be reduced. On the other hand, if the total width SW is simply made smaller, the load capacity of the pneumatic tire 1 is reduced. However, by satisfying Formula <1>, the outer diameter OD is large relative to the total width SW, and thus a reduction in load capacity can be prevented or minimized.

(2) The pneumatic tire 1 according to the present embodiment is formed so that the groove area ratio GR relative to the ground contact area takes a value in the range indicated by Formula <2>. This range of groove area ratio GR is set low compared to a typical pneumatic tire. Accordingly, by increasing the area of ground contact of the land portions 14, the rigidity of the tread portion 10 is increased, and thus the steering stability can be improved. Note that when the groove area ratio GR is greater than 25%, the rigidity of the tread portion 10 is decreased, and thus cornering force is unable to be sufficiently ensured and steering stability is difficult to improve. In addition, when the total width SW is small as described above, water drainage properties are improved. However, when the groove area ratio GR decreases below 10%, the grooves 12, 16 provided in the tread portion 10 are decreased, and thus water is unable to be sufficiently drained in the ground contact region G. As a result, maintaining water drainage properties is difficult in terms of overall design of the tire.

(3) The pneumatic tire 1 according to the present embodiment is formed so that the groove area ratio GR in the ground contact region G, the ground contact groove area ratio GRo in the tire outside region Ao, and the ground contact groove area ratio GRi in the tire inside region Ai satisfy Formula <3> and Formula <4>. As a result, the grooves provided in the tire outside region Ao are decreased more so than in the tire inside region Ai. Accordingly, as described in (2) above, the pneumatic tire 1 according to the present embodiment can prevent or minimize a decrease in water drainage properties caused by the comparatively low groove area ratio GR by making the ground contact groove area ratio GRi in the tire inside region Ai greater than the ground contact groove area ratio GRo in the tire outside region Ao. In addition, the area of the land portions 14 located in the tire outside region Ao that come into contact with the ground is greater than that in the tire inside region Ai. As a result, the rigidity of the tread portion 10 in the tire outside region Ao is high. Accordingly, sufficient cornering force can be obtained and steering stability can be improved. Note that in relation to Formula <4>, when ((GRi−GRo)/GR) is less than 0.1, degradation of water drainage properties are not able to be sufficiently prevented. When ((GRi−GRo)/GR) is greater than 0.6, block rigidity of the tread portion 10 in the tire inside region Ai decreases excessively, and steering stability may be reduced.

(4) As described in (1), the pneumatic tire 1 according to the present embodiment has an outer diameter OD that is relatively large and a total width SW that is relatively narrow compared to a pneumatic tire of a typical size. Accordingly, reduced space occupation, improvements in design, and the like are anticipated to be achieved.

In addition, the groove area ratios GR, GRi, and GRo more preferably satisfy the relationships:

$$15\% \leq GR \leq 22\%, \text{ and/or}$$

$$0.2 \leq (GRi-GRo)/GR \leq 0.4.$$

This is because degradation of water drainage properties is prevented or minimized, and rigidity of the tread portion 10 in the tire outside region Ao is increased and thus steering stability can be achieved to a high degree.

Here, as illustrated in FIG. 14, the plurality of lateral grooves 16 are disposed in the tread portion 10. In relation to a groove area ratio GRL of the lateral grooves 16 (the ratio of the groove area of the lateral grooves 16 to the sum of the land portion area and groove area (=ground contact area) within the ground contact region G), a groove area ratio GRLo of the lateral grooves 16 in the tire outside region Ao and a groove area ratio GRLi of the lateral grooves 16 in the tire inside region Ai preferably have a relationship satisfying:

$$1.1 \leq GRLi/GRLo \leq 1.9 \qquad <5>$$

This is because both degradation of water drainage properties can be prevented or minimized and steering stability can be improved by increased block rigidity and ground contact area to a high degree. Note that when (GRLi/GRLo) is less than 1.1, the effectiveness of preventing or minimizing the degradation of water drainage properties is not sufficient. When (GRLi/GRLo) is greater than 1.9, the decrease in block rigidity of the tread portion 10 in the tire inside region Ai is significant, and steering stability may decrease.

In addition, around the entire circumference of the tread portion 10 of the pneumatic tire 1 of the present embodiment, of the lateral grooves 16 disposed at intervals in the circumferential direction, the number Pi of the lateral grooves 16A, 16B disposed in the tire outside region Ao and the number Po of the lateral grooves 16C, 16D, 16E disposed in the tire inside region Ai preferably have a relationship satisfying $$1 < Pi/Po \leq 2 \qquad <6>$$

This is because by disposing more lateral grooves 16 in the tire inside region Ai than in the tire outside region Ao, improvements in water drainage properties can be anticipated, and furthermore, that degradation of water drainage properties can be prevented or minimized and also steering stability can be improved by increased block rigidity and ground contact area to a high degree.

In addition, for a similar reason as Formula <6>, the number of lateral grooves 16C, 16D, 16E located in the tire inside region Ai is preferably from 40 to 80, both inclusive. Note that the number of lateral grooves 16C, 16D, 16E means the total number of grooves disposed around the entire circumference of the tire including any of the lateral grooves 16C, 16D, 16E aligned and adjacent to one another in the tire circumferential direction with the largest interval between respective lateral grooves 16C, 16D, 16E.

In addition, as illustrated in FIG. 14, in the tread portion 10 as described above, the circumferential grooves 12C, 12D (corresponding to inner circumferential grooves) are disposed in the tire inside region Ai, and the circumferential grooves 12A, 12B (corresponding to outer circumferential grooves) are disposed in the tire outside region Ao. When configured as such, the groove area ratio GRBi of the circumferential grooves 12C, 12D located in the tire inside region Ai and the groove area ratio GRBoi of the circumferential grooves 12A, 12B located in the tire outside region Ao preferably have the relationship satisfying:

$$1 \leq GRBi/GRBoi \leq 2 \qquad <7>$$

This is because the degradation of water drainage properties can be further prevented or minimized by making the groove area ratio GRBi of the circumferential grooves 12C, 12D located in the tire inside region Ai greater.

As described above, the circumferential grooves 12 and the lateral grooves 16 are both disposed in the tread portion 10 of the pneumatic tire 1 of the present embodiment. However, in the present technology, the grooves 12, 16 are disposed in the tread portion 10 of the pneumatic tire 1, and the ground contact region G of the pneumatic tire 1 is formed to satisfy at least Formula <2> to Formula <4>. In other words, any one of: the circumferential groove 12 and the lateral groove 16 are disposed in the tread portion 10 of the pneumatic tire 1 of the present technology to satisfy at least Formula <2> to Formula <4>.

Modified Example

Figure 15:
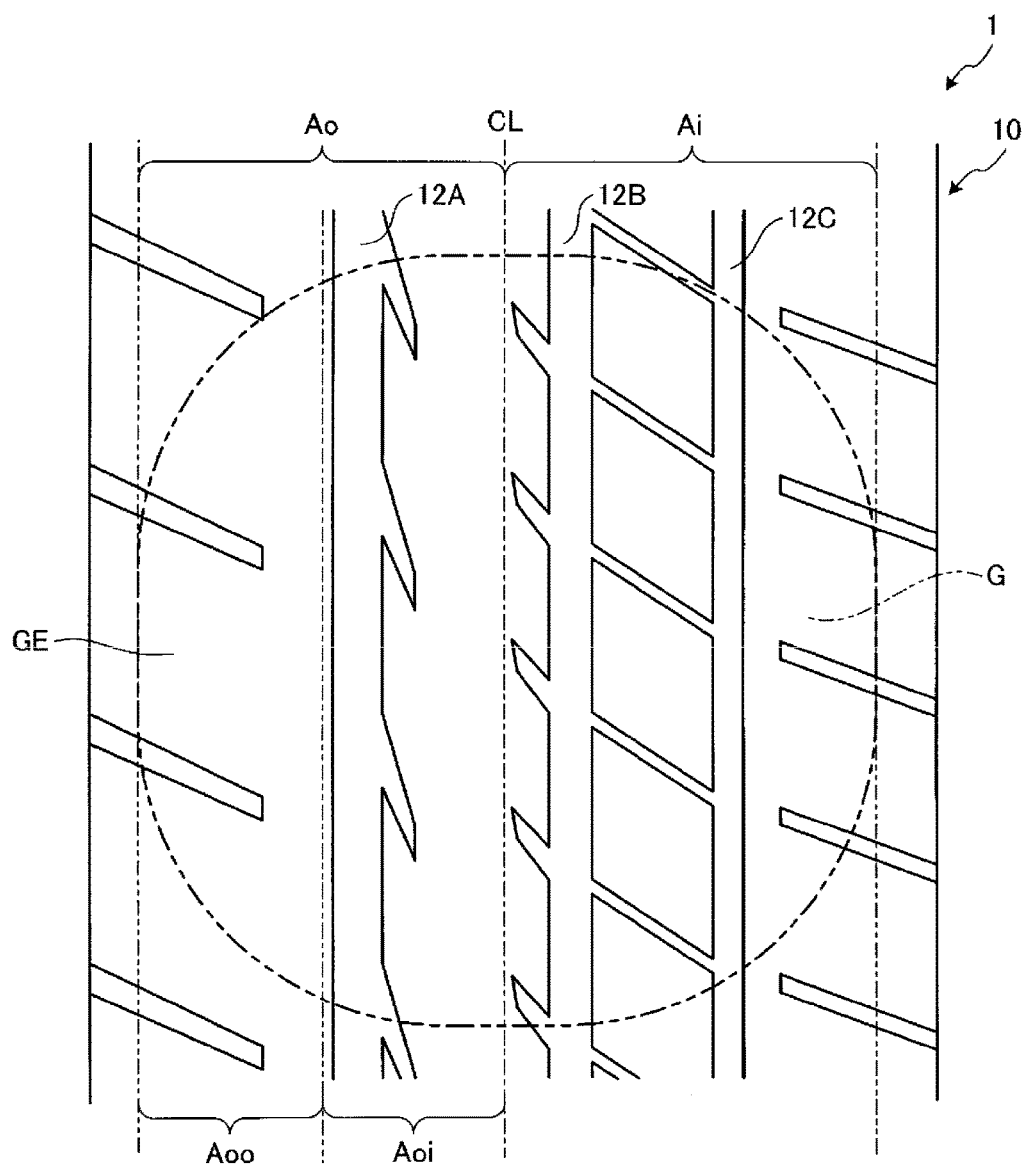
FIG. 15 is a planar development diagram illustrating a portion of a tread portion of a pneumatic tire according to a modified example of the seventh embodiment.

FIG. 15 is a planar development view illustrating a portion of a tread portion of a pneumatic tire according to a modified example of the embodiment of the present technology. Here, outer tire inside region Aoi and outer tire outside region Aoo are specified with reference to FIG. 15. The outer tire inside region Aoi is a region located to the tire equator line CL side of the tire outside region Ao having a width equivalent to 25% of the width of the ground contact width W. The outer tire outside region Aoo is a region located to the ground contact edge side in the tire width direction of the tire outside region Ao except the outer tire inside region Aoi. The outer tire outside region Aoo has a width equivalent to 25% of the width of the ground contact width W.

Here, as illustrated in FIG. 15, the circumferential groove 12A extending in the tire circumferential direction is preferably disposed in the outer tire inside region Aoi, and preferably no circumferential grooves 12 are disposed in the outer tire outside region Aoo. This is because by thus securing distance in the tire width direction from the ground contact width edge GE to the circumferential groove 12A in the tire outside region Ao, rigidity of the tread portion 10 in the tire width direction can be increased and steering stability when cornering can be improved.

EXAMPLES

With Working Examples, various tire performance tests for rolling resistance coefficient (RRC) index, fuel economy index, steering stability, resistance to hydroplaning (water drainage properties) were carried out on pneumatic tires having various conditions met.

In these performance tests, each test tire was assembled on a rim with a compatible size as described above and inflated to an internal pressure of 230 kPa for the actual vehicle tests.

The following is a description of the test methods for the performance tests carried out on the test tires.

Fuel Economy Performance

The test tires were mounted to a front wheel drive vehicle with an engine displacement of 1800 cc, driven for 50 laps at a speed of 100 km/h on a 2 km long test course, and the fuel economy improvement rate was measured relative to the fuel consumption rate of Conventional Example, Conventional Example being assigned a reference value of 100. Larger index values indicate better fuel economy.

Steering Stability

The test tires were assembled onto a standard rim and mounted to a passenger vehicle (engine displacement 1800 cc), and the ride feeling when driving while changing lanes for three laps on a 2 km long test course was evaluated by three specialist drivers. The evaluation results for the average value of the evaluation points for each test tire were expressed as an index, with the average value of the ride feeling evaluation points of Comparative Example 1 as 100. Larger scores indicate superior steering stability.

Resistance to Hydroplaning

Resistance to hydroplaning was evaluated by carrying out a straight line hydroplaning test in which the speed was measured at which hydroplaning occurred. In this straight line hydroplaning test, the test vehicle was driven into a pool of water depth 10 mm while increasing the velocity, and the slip ratio of the pneumatic tire was measured. The velocity at which the slip ratio was 10% was taken to be the velocity at which hydroplaning occurs. In this test, the measurement results of examples other than Conventional Example were expressed as an index with the measurement results of the Conventional Example as 100. With Working Examples, larger index values indicate better resistance to hydroplaning.

The following is a description of each of the test tires and the results of the performance tests. Performance tests for fuel economy index, steering stability, and resistance to hydroplaning (hydro performance) were carried out on the pneumatic tires according to Conventional Example and Working Examples 7 to 18. Table 4 shows numerical values of the dimensions of each test tire and the results of the performance tests.

TABLE 4

|  | Conventional Example | Working Example 7 | Working Example 8 | Working Example 9 | Working Example 10 | Working Example 11 | Working Example 12 |
|---|---|---|---|---|---|---|---|
| Nominal width (total width) SW | 205 | 165 | 165 | 165 | 165 | 165 | 165 |
| Aspect ratio | 55 | 55 | 55 | 55 | 55 | 55 | 55 |
| Inner diameter RD (inch) | 16 | 20 | 20 | 20 | 20 | 20 | 20 |
| Outer diameter OD (mm) | 632 | 695 | 695 | 695 | 695 | 695 | 695 |
| SW/OD | 0.32 | 0.24 | 0.24 | 0.24 | 0.24 | 0.24 | 0.24 |
| Annular structure | Absent | Present | Present | Present | Present | Present | Present |
| GR (%) | 30 | 8 | 30 | 20 | 20 | 20 | 20 |
| (GRi-GRo)/GR | 0.00 | 0.35 | 0.35 | 0.00 | 0.70 | 0.35 | 0.35 |
| GRLi/GRLo | 1.0 | 1.5 | 1.5 | 1.5 | 1.5 | 1.0 | 2.0 |
| Pi/Po | 1.0 | 1.5 | 1.5 | 1.5 | 1.5 | 1.5 | 1.5 |
| Outside position of circumferential groove | Aoi, Aoo | Aoi | Aoi | Aoi | Aoi | Aoi | Aoi |
| GRBi/GRBo | 1.0 | 1.5 | 1.5 | 1.5 | 1.5 | 1.5 | 1.5 |
| Fuel economy index | 100.0 | 102.5 | 103.0 | 103.0 | 103.0 | 103.0 | 103.0 |
| Steering stability | 100 | 115 | 100 | 110 | 105 | 110 | 105 |
| Hydro performance | 115 | 100 | 105 | 102 | 107 | 102 | 107 |

|  | Working Example 13 | Working Example 14 | Working Example 15 | Working Example 16 | Working Example 17 | Working Example 18 |
|---|---|---|---|---|---|---|
| Nominal width (total width) SW | 165 | 165 | 165 | 165 | 165 | 165 |
| Aspect ratio | 55 | 55 | 55 | 55 | 55 | 55 |
| Inner diameter RD (inch) | 20 | 20 | 20 | 20 | 20 | 20 |
| Outer diameter OD (mm) | 695 | 695 | 695 | 695 | 695 | 695 |
| SW/OD | 0.24 | 0.24 | 0.24 | 0.24 | 0.24 | 0.24 |
| Annular structure | Present | Present | Present | Present | Present | Present |
| GR (%) | 20 | 20 | 20 | 20 | 20 | 20 |
| (GRi-GRo)/GR | 0.35 | 0.35 | 0.35 | 0.35 | 0.35 | 0.35 |
| GRLi/GRLo | 1.5 | 1.5 | 1.5 | 1.5 | 1.5 | 1.5 |
| Pi/Po | 1.0 | 2.1 | 1.5 | 1.5 | 1.5 | 1.5 |
| Outside position of circumferential groove | Aoi | Aoi | Aoo | Aoi | Aoi | Aoi |
| GRBi/GRBo | 1.5 | 1.5 | 1.5 | 0.9 | 2.1 | 1.5 |
| Fuel economy index | 103.0 | 103.0 | 102.5 | 103.0 | 103.0 | 103.0 |
| Steering stability | 110 | 105 | 110 | 110 | 105 | 110 |
| Hydro performance | 103 | 107 | 107 | 105 | 110 | 110 |

In Table 4, that "Annular structure" is "Absent" means the belt layer is a conventional belt layer with arranged cords. That "Annular structure" is "Present" means the belt layer is the annular structure 100 according to the present technology. In other words, in Table 4, the tires according to Conventional Example did not include the annular structure 100 according to the present technology. The tires according to Working Examples 7 to 18 included the annular structure 100 according to the present technology. The tires of Conventional Example included a typically used belt layer with arranged cords instead of the annular structure 100.

In addition, in the category of Table 4, "Outside position of circumferential groove", "Aoi" means that the circumferential groove 12 is disposed in the outer tire inside region Aoi, "Aoo" means that the circumferential groove 12 is disposed in the outer tire outside region Aoo, and "Aoi, Aoo" means that the circumferential groove 12 is disposed in both the outer tire inside region Aoi and the outer tire outside region Aoo.

Figure 16:
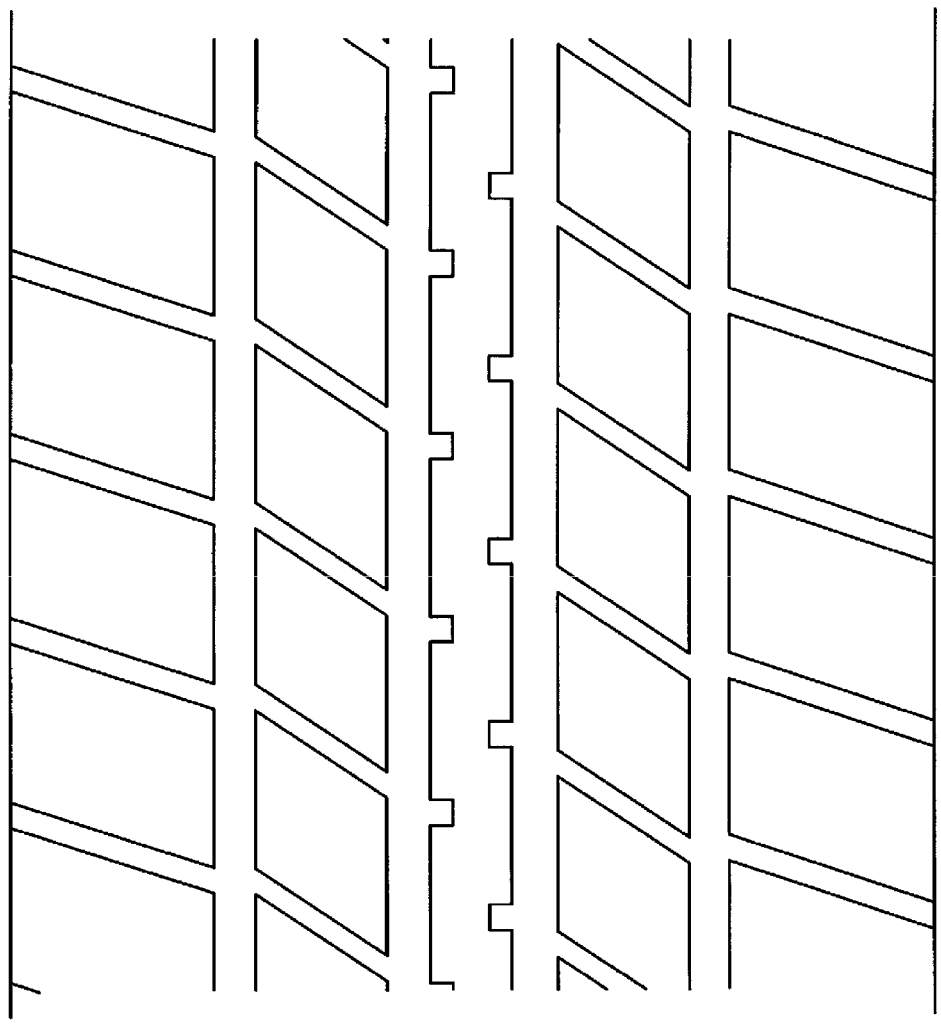
FIG. 16 is a planar development diagram illustrating a portion of a tread portion of a pneumatic tire of a conventional example.

The pneumatic tire according to Conventional Example had a tire size of 205/55R16, and the value for (SW/OD) was 0.32, meaning that Formula <1> was not satisfied. In addition, the pneumatic tire according to Conventional Example did not include the annular structure. The tread portion of the pneumatic tire according to Conventional Example was provided with the tread pattern illustrated in FIG. 16.

The pneumatic tires according to Working Examples 7 to 18 had a tire size of 165/55R20, and the value for (SW/OD) was 0.24, meaning that Formula <1> was satisfied. The tread portion 10 of the pneumatic tires according to Working Examples 7 to 18 was provided with a tread pattern based on the tread pattern illustrated in FIG. 16 and varied to suit each of the tire sizes.

The pneumatic tire according to Conventional Example was used as the reference tire for steering stability. That is, in the present technology, for the steering stability, a tire with its tire size changed to the narrow width large diameter tire size for rolling resistance, and thus with reduced steering stability was taken as a reference. Then, the pneumatic tires according to Working Examples were evaluated on how much the steering stability was improved over Conventional Example.

Here, the tread portion of the pneumatic tires according to Working Examples and Conventional Example was provided with a tread pattern based on the tread pattern of Conventional Example (tread pattern illustrated in FIG. 16) and varied to suit the dimension parameters such as groove area ratio GR set for each of the test tires. As seen in the tread pattern illustrated in FIG. 14, the pneumatic tire according to Working Examples was provided with a tread pattern based on the tread pattern illustrated in FIG. 16, and the groove area of the circumferential grooves 12 and the lateral grooves 16, the number and position in the tire width direction of the circumferential grooves 12, and the like were varied to suit the dimension parameters of each of the test tires.

As shown in Table 4, Conventional Example did not satisfy Formula <1>, Formula <2>, Formula <3>, Formula <4>, Formula <5>, Formula <6>, and Formula <7>. In addition, Conventional Example did not include the annular structure. In addition, Conventional Example was provided with the circumferential groove 12 in the outer tire inside region Aoi and the outer tire outside region Aoo.

Working Example 7 satisfied Formula <1>, Formula <3>, Formula <4>, Formula <5>, Formula <6>, and Formula <7> but did not satisfy Formula <2>. Working Example 7 had a GR of 8%. In addition, Working Example 7 included the annular structure. Working Example 7 was provided with the circumferential groove 12 in the outer tire inside region Aoi but was not provided with the circumferential groove 12 in the outer tire outside region Aoo.

Working Example 8 satisfied Formula <1>, Formula <3>, Formula <4>, Formula <5>, Formula <6>, and Formula <7> but did not satisfy Formula <2>. Working Example 8 had a GR of 30%. In addition, Working Example 8 included the annular structure. Working Example 8 was provided with the circumferential groove 12 in the outer tire inside region Aoi but was not provided with the circumferential groove 12 in the outer tire outside region Aoo.

Working Example 9 satisfied Formula <1>, Formula <2>, Formula <3>, Formula <5>, Formula <6>, and Formula <7> but did not satisfy Formula <4>. In Working Example 9, (GRi−GRo)/GR was 0.00. In addition, Working Example 9 included the annular structure. Working Example 9 was provided with the circumferential groove 12 in the outer tire inside region Aoi but was not provided with the circumferential groove 12 in the outer tire outside region Aoo.

Working Example 10 satisfied Formula <1>, Formula <2>, Formula <3>, Formula <5>, Formula <6>, and Formula <7> but did not satisfy Formula <4>. In Working Example 10, (GRi−GRo)/GR was 0.70. In addition, Working Example 10 included the annular structure. Working Example 10 was provided with the circumferential groove 12 in the outer tire inside region Aoi but was not provided with the circumferential groove 12 in the outer tire outside region Aoo.

Working Example 11 satisfied Formula <1>, Formula <2>, Formula <3>, Formula <4>, Formula <6>, and Formula <7> but did not satisfy Formula <5>. In Working Example 11, GRLi/GRo was 1.0. In addition, Working Example 11 included the annular structure. Working Example 11 was provided with the circumferential groove 12 in the outer tire inside region Aoi but was not provided with the circumferential groove 12 in the outer tire outside region Aoo.

Working Example 12 satisfied Formula <1>, Formula <2>, Formula <3>, Formula <4>, Formula <6>, and Formula <7> but did not satisfy Formula <5>. In Working Example 12, GRLi/GRo was 2.0. In addition, Working Example 12 included the annular structure. Working Example 12 was provided with the circumferential groove 12 in the outer tire inside region Aoi but was not provided with the circumferential groove 12 in the outer tire outside region Aoo.

Working Example 13 satisfied Formula <1>, Formula <2>, Formula <3>, Formula <4>, Formula <5>, and Formula <7> but did not satisfy Formula <6>. In Working Example 13, Pi/Po was 1.0. In addition, Working Example 13 included the annular structure. Working Example 13 was provided with the circumferential groove 12 in the outer tire inside region Aoi but was not provided with the circumferential groove 12 in the outer tire outside region Aoo.

Working Example 14 satisfied Formula <1>, Formula <2>, Formula <3>, Formula <4>, Formula <5>, and Formula <7> but did not satisfy Formula <6>. In Working Example 14, Pi/Po was 2.1. In addition, Working Example 14 included the annular structure. Working Example 14 was provided with the circumferential groove 12 in the outer tire inside region Aoi but was not provided with the circumferential groove 12 in the outer tire outside region Aoo.

Working Example 15 satisfied Formula <1>, Formula <2>, Formula <3>, Formula <4>, Formula <5>, Formula <6>, and Formula <7>. Working Example 15 included the annular structure. Working Example 15 was provided with the circumferential groove 12 in the outer tire outside region Aoo but was not provided with the circumferential groove 12 in the outer tire inside region Aoi.

Working Example 16 satisfied Formula <1>, Formula <2>, Formula <3>, Formula <4>, Formula <5>, and Formula <6> but did not satisfy Formula <7>. In Working Example 16, GRBi/GRBo was 0.9. In addition, Working Example 16 included the annular structure. Working Example 16 was provided with the circumferential groove 12 in the outer tire inside region Aoi but was not provided with the circumferential groove 12 in the outer tire outside region Aoo.

Working Example 17 satisfied Formula <1>, Formula <2>, Formula <3>, Formula <4>, Formula <5>, and Formula <6> but did not satisfy Formula <7>. In Working Example 17, GRBi/GRBo was 2.1. In addition, Working Example 17 included the annular structure. Working Example 17 was provided with the circumferential groove 12 in the outer tire inside region Aoi but was not provided with the circumferential groove 12 in the outer tire outside region Aoo.

Working Example 18 satisfied Formula <1>, Formula <2>, Formula <3>, Formula <4>, Formula <5>, Formula <6>, and Formula <7>. In addition, Working Example 18 included the annular structure. Working Example 18 was provided with the circumferential groove 12 in the outer tire inside region Aoi but was not provided with the circumferential groove 12 in the outer tire outside region Aoo.

According to the results of the performance tests shown in Table 4, the pneumatic tires according to Working Examples 7 to 18 in which Formula <1> was satisfied had fuel economy indices greater than that of Conventional Example. Also according to the results of the performance tests, from among the tested tire sizes, the tire size of 165/55R20 was confirmed to have a sufficient improvement in fuel economy over the tire size of 205/55R16 of Conventional Example shown in Table 4.

In addition, according to the results of the performance tests shown in Table 4, the pneumatic tires according to Working Examples 11 to 18 in which Formula <1> to Formula <4> were satisfied had fuel economy indices and steering stability superior to that of Conventional Example.

In other words, these test tires were capable of reducing rolling resistance and improving the steering stability reduced by reducing the rolling resistance.

Note that the groove area ratio GR of the pneumatic tire according to Working Example 7 (the tire in which Formula <2> is not satisfied) was excessively low (GR=8%). Thus, while having good steering stability, resistance to hydroplaning was reduced to a great degree.

In addition, according to the results of the performance tests shown in Table 4, the pneumatic tires according to Working Examples 13 to 18 in which Formula <1> to Formula <5> were satisfied achieved both steering stability and resistance to hydroplaning to a higher degree.

According to the results of the performance tests shown in Table 4, the pneumatic tires according to Working Examples 15 to 18 in which Formula <1> to Formula <6> were satisfied achieved both steering stability and resistance to hydroplaning to a higher degree.

According to the results of the performance tests shown in Table 4, as is evident from Working Example 15 and Working Example 18, the pneumatic tire according to Working Example 18 provided with the circumferential groove in the outer tire inside region Aoi had superior steering stability and resistance to hydroplaning compared to the pneumatic tire according to Working Example 15 not provided with the circumferential groove in the outer tire inside region Aoi.

In addition, according to the results of the performance tests shown in Table 4, the pneumatic tire according to Working Example 18 in which the Formula <1> to Formula <7> were satisfied had superior resistance to hydroplaning compared to the pneumatic tires according to Working Example 16 and Working Example 17 in which while Formula <1> to Formula <6> were satisfied, Formula <7> was not satisfied.

Note that the technology has been described with reference to specific embodiments. However, various modifications and changes made without deviating from the scope and the spirit of the present technology are possible for one skilled in the art.

The present technology is specified below.

(1) A pneumatic tire with an asymmetrical pattern formed by grooves in a tread portion, wherein $$SW/OD \leq 0.30$$

is satisfied, where SW/OD is a ratio between a total width SW and an outer diameter OD of the pneumatic tire; and
the ground contact region is formed satisfying: $10\% \leq GR \leq 25\%$, $GRo < GRi$, and $0.1 \leq (GRi-GRo)/GR \leq 0.6$ where GRi is a groove area ratio in a tire inside region Ai, and GRo is a groove area ratio in a tire outside region Ao, where the tire inside region Ai is a region within the ground contact region located to a vehicle side of a tire equator line when the pneumatic tire is mounted on a vehicle, and the tire outside region Ao is a region within the ground contact region located to a side of the tire equator line opposite the vehicle side when the pneumatic tire is mounted on a vehicle.

(2) The pneumatic tire according to (1), wherein
a plurality of lateral grooves that traverse a tire circumferential direction are provided in the tread portion; and $$1.1 \leq GRLi/GRLo \leq 1.9$$

is satisfied, where GRL is a groove area ratio of the lateral grooves in the ground contact region, GRLo is a groove area ratio of the lateral grooves in the tire outside region Ao, and GRLi is a groove area ratio of the lateral grooves in the tire inside region Ai.

(3) The pneumatic tire according to (2), wherein
the lateral grooves are disposed at intervals in the tire circumferential direction; and $$1 < Pi/Po \leq 2$$

is satisfied, where Pi is a number of the lateral grooves disposed in the tire inside region Ai and Po is a number of the lateral grooves disposed in the tire outside region Ao around an entire circumference of the tread portion of the pneumatic tire.

(4) The pneumatic tire according to any one of (1) to (3), wherein
a circumferential groove extending in the tire circumferential direction is provided in an outer tire inside region Aoi and not provided in an outer tire outside region Aoo,
the outer tire inside region Aoi being a region located to the tire equator line side of the tire outside region Ao having a width equivalent to 25% of a ground contact width, and the outer tire outside region Aoo being a region of the tire outside region Ao except the outer tire inside region Aoi.

(5) The pneumatic tire according to any one of (1) to (4), wherein
an inner circumferential groove, which is a circumferential groove extending in the tire circumferential direction, is provided in the tire inside region Ai;
an outer circumferential groove, which is a circumferential groove extending in the tire circumferential direction, is provided in the tire outside region Ao; and $$1 \leq GRBi/GRBo \leq 2$$

is satisfied, where GRBi is a groove area ratio of the inner circumferential groove in the tire inside region Ai, and GRBo is a groove area ratio of the outer circumferential groove in the tire outside region Ao.

Note that the first to seventh embodiments described above can be combined as appropriate. For example, the belt layer of the tire 1 described in the seventh embodiment can be the annular structure 100 described in the first to sixth embodiments. Specifically, the tire 1 including the annular structure 100, the carcass portion 120, and the tread rubber layer 11 described in the first to sixth embodiments may satisfy Formula <1> described in the seventh embodiment, and the tread portion 10 of this tread rubber layer 11 may satisfy Formula <2> to Formula <4>. In addition, the tread portion 10 of the tire 1 described in the first to sixth embodiments may satisfy at least one of: Formula <5>, Formula <6>, and Formula <7> described in the seventh embodiment. This tire 1 may also include at least one of the annular structures described in the second to sixth embodiments. In addition, these tires 1 may satisfy at least one of Formula (1A) to Formula (8B) described in the first embodiment.

The invention claimed is:

1. A pneumatic tire comprising:
a cylindrical annular structure disposed around a rotational axis;
a carcass portion including a rubber covered cord, at least a portion of the carcass portion being disposed to an outer side of the annular structure in a direction parallel to the rotational axis; and
a rubber layer including a tread portion, at least a portion of the rubber layer being disposed to an outer side of the annular structure in a radiation direction with respect to the rotational axis; wherein
$SW/OD \leq 0.30$ is satisfied, where SW is a total tire width and OD is a tire outer diameter; and $1.00 \leq BW/W \leq 1.1$ and $0.82 \leq W/SW \leq 0.90$ are satisfied, where W is a width of a ground contact region of the tread portion and BW is a dimension of the annular structure in the direction parallel to the rotational axis.

2. The pneumatic tire according to claim 1, wherein a ground contact surface of the tread portion and an outer surface of the annular structure that faces outward in the radiation direction with respect to the rotational axis are parallel to the rotational axis.

3. The pneumatic tire according to claim 1, wherein $$0.14 \times (OD-RD)/2SW + 0.65 \leq W/SW \leq 0.14 \times (OD-RD)/2SW + 0.76$$

is satisfied, where W is a width of a ground contact region of the tread portion, and RD is a tire rim diameter.

4. The pneumatic tire according to claim 1, wherein the annular structure includes a plurality of through holes.

5. The pneumatic tire according to claim 1, wherein the annular structure is formed of a strip-shaped metal plate, end portions thereof being welded together; and $$150 \ GPa \leq E \leq 250 \ GPa, \text{ and}$$

$$0.2 \ mm \leq Tb \leq 0.8 \ mm$$

are satisfied, where E is a Young's modulus of the metal, and Tb is a thickness of the plate.

6. The pneumatic tire according to claim 1, wherein the rubber layer includes:
a main groove formed in the tread portion to surround the rotational axis, and
an inner surface that faces a direction opposite the ground contact surface of the tread portion; and $$0.05 \leq Tu/T1 \leq 0.15$$

is satisfied, where T1 is a first thickness of the rubber layer, the first thickness corresponding to a distance from the ground contact surface of the tread portion to the inner surface, and Tu is a second thickness of the rubber layer, the second thickness corresponding to a distance from a bottom surface of the main groove to the inner surface.

7. The pneumatic tire according to claim 1, wherein the rubber layer includes a narrow groove formed, to surround the rotational axis, in an edge region that includes an edge portion of the ground contact region of the tread portion in the direction parallel to the rotational axis;
a center of the edge region in the direction parallel to the rotational axis is aligned with the edge portion of the ground contact region; and $$DW = 0.1W$$

is satisfied, where W is the width of the ground contact region of the tread portion, and DW is a width of the edge region.

8. The pneumatic tire according to claim 1, wherein the annular structure includes a recess and protrusion portion on at least a portion of end portions of the annular structure in the direction parallel to the rotational axis.

9. The pneumatic tire according to claim 1, wherein an asymmetrical pattern is formed by grooves in the tread portion; and the ground contact region is formed satisfying:

$$10\% \leq GR \leq 25\%,$$

$$GRo < GRi, \text{ and}$$

$$0.1 \leq (GRi - GRo)/GR \leq 0.6$$

where GR is a groove area ratio in the ground contact region of the tread portion, GRi is a groove area ratio in a tire inside region Ai, and GRo is a groove area ratio in a tire outside region Ao,
where the tire inside region Ai is a region within the ground contact region located to a vehicle side of a tire equator line when the pneumatic tire is mounted on a vehicle, and the tire outside region Ao is a region within the ground contact region located to a side of the tire equator line opposite the vehicle side when the pneumatic tire is mounted on a vehicle.

10. The pneumatic tire according to claim 9, wherein a plurality of lateral grooves that traverse a tire circumferential direction are provided in the tread portion; and $$1.1 \leq GRLi/GRLo \leq 1.9$$

is satisfied, where GRL is a groove area ratio of the lateral grooves in the ground contact region, GRLo is a groove area ratio of the lateral grooves in the tire outside region Ao, and GRLi is a groove area ratio of the lateral grooves in the tire inside region Ai.

11. The pneumatic tire according to claim 10, wherein the lateral grooves are disposed at intervals in the tire circumferential direction; and $$1 < Pi/Po \leq 2$$

is satisfied, where Pi is a number of the lateral grooves disposed in the tire inside region Ai and Po is a number of the lateral grooves disposed in the tire outside region Ao around an entire circumference of the tread portion of the pneumatic tire.

12. The pneumatic tire according to claim 9, wherein a circumferential groove extending in the tire circumferential direction is provided in an outer tire inside region Aoi and not provided in an outer tire outside region Aoo,
the outer tire inside region Aoi being a region located to the tire equator line side of the tire outside region Ao having a width equivalent to 25% of a ground contact width, and the outer tire outside region Aoo being a region of the tire outside region Ao except the outer tire inside region Aoi.

13. The pneumatic tire according to claim 9, wherein an inner circumferential groove that is a circumferential groove extending in the tire circumferential direction is provided in the tire inside region Ai;
an outer circumferential groove that is a circumferential groove extending in the tire circumferential direction is provided in the tire outside region Ao; and $$1 \leq GRBi/GRBo \leq 2$$

is satisfied, where GRBi is a groove area ratio of the inner circumferential groove in the tire inside region Ai, and GRBo is a groove area ratio of the outer circumferential groove in the tire outside region Ao.

14. The pneumatic tire according to claim 1, wherein the annular structure is made of a metal plate.

* * * * *

UNITED STATES PATENT AND TRADEMARK OFFICE
CERTIFICATE OF CORRECTION

PATENT NO. : 10,308,075 B2
APPLICATION NO. : 15/108226
DATED : June 4, 2019
INVENTOR(S) : Kubota et al.

Page 1 of 1

It is certified that error appears in the above-identified patent and that said Letters Patent is hereby corrected as shown below:

On the Title Page

Item (72) the correct name of the first inventor is Masataka Kubota.

Signed and Sealed this
Seventeenth Day of December, 2019

Andrei Iancu
*Director of the United States Patent and Trademark Office*